(12) United States Patent
Ushirokawa et al.

(10) Patent No.: US 7,203,208 B2
(45) Date of Patent: Apr. 10, 2007

(54) MOBILE COMMUNICATION SYSTEM, COMMUNICATION CONTROL METHOD, AND BASE STATION AND MOBILE STATION TO BE EMPLOYED IN THE SAME

(75) Inventors: Akihisa Ushirokawa, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/348,942

(22) Filed: Jan. 23, 2003

(65) Prior Publication Data

US 2003/0118057 A1 Jun. 26, 2003

Related U.S. Application Data

(63) Continuation of application No. 09/287,570, filed on Apr. 6, 1999.

(30) Foreign Application Priority Data

| Apr. 7, 1998 | (JP) | ............................. 10-094288 |
| Nov. 2, 1998 | (JP) | ............................. 10-311733 |

(51) Int. Cl.
H04J 3/12 (2006.01)
H04B 7/216 (2006.01)
H04B 7/20 (2006.01)

(52) U.S. Cl. ................... 370/528; 370/320; 370/335; 370/503; 455/70; 455/522

(58) Field of Classification Search ............. 370/320, 370/331, 335, 345, 347–348, 528, 465; 455/70, 455/522

See application file for complete search history.

(56) References Cited

U.S. PATENT DOCUMENTS

| 5,513,215 A | | 4/1996 | Marchetto et al. |
| 5,568,483 A | * | 10/1996 | Padovani et al. ........... 370/468 |
| 5,592,483 A | | 1/1997 | Heida et al. |
| 5,600,471 A | * | 2/1997 | Hirohashi et al. .......... 398/136 |
| 5,692,015 A | | 11/1997 | Higashi et al. |
| 5,896,368 A | | 4/1999 | Dahlman et al. |
| 5,930,366 A | | 7/1999 | Jamal et al. |
| 6,021,330 A | | 2/2000 | Vannucci |
| 6,069,884 A | * | 5/2000 | Hayashi et al. ............. 370/335 |
| 6,154,652 A | | 11/2000 | Park et al. |

(Continued)

FOREIGN PATENT DOCUMENTS

CA 2252382 10/1997

*Primary Examiner*—Chi Pham
*Assistant Examiner*—Ronald Abelson
(74) *Attorney, Agent, or Firm*—Sughrue Mion, PLLC

(57) ABSTRACT

In the communication system performing transmission with generating the vacant period in the slotted mode during data transmission in order to perform various process, such as different frequency carrier quality measurement or so forth, the control signal for maintaining a communication quality is inserted even in the vacant period. Therefore, a link quality may not be degraded even if the vacant period is long. Namely, when the pilot signal is used as the control signal, even in the vacant period, measurement of the link quality of the forward link with the pilot signal is performed in the mobile station to report the result of measurement to the base station. Therefore, transmission power control of the forward link can be performed according to the report in the base station. Therefore, degradation of the forward link can be eliminated.

80 Claims, 13 Drawing Sheets

U.S. PATENT DOCUMENTS

| | | |
|---|---|---|
| 6,330,233 B1 | 12/2001 | Miya et al. |
| 6,341,124 B1 * | 1/2002 | Johansson et al. ........... 370/335 |
| 6,377,809 B1 | 4/2002 | Rezaiifar et al. |
| 6,493,335 B1 * | 12/2002 | Darcie et al. ................ 370/344 |
| 6,574,211 B2 * | 6/2003 | Padovani et al. ............ 370/347 |
| 6,708,041 B1 * | 3/2004 | Butovitsch et al. ......... 455/522 |
| 6,745,012 B1 * | 6/2004 | Ton et al. ................. 455/67.13 |
| 6,977,967 B1 * | 12/2005 | Tiedemann et al. ......... 375/297 |
| 2003/0031143 A1 * | 2/2003 | Faerber ....................... 370/331 |

* cited by examiner

MOBILE COMMUNICATION SYSTEM, COMMUNICATION CONTROL METHOD, AND BASE STATION AND MOBILE STATION TO BE EMPLOYED IN THE SAME

This is a continuation of application Ser. No. 09/287,570 filed Apr. 6, 1999; the disclosure of which is incorporated herein by reference.

BACKGROUND OF THE INVENTION

1. Field of the Invention

The present invention relates generally to a mobile communication system, a communication control method, and a base station and a mobile station to be employed in the mobile communication system. More particularly, the invention relates to a mobile communication system, in which a vacant time containing no communication data is provided in one or more of communication frames to be transmitted from the base station to the mobile station and a process, such as quality measurement of radio link of a different frequency carrier, for example, is performed during the vacant period at the mobile station.

2. Description of the Related Art

In the mobile communication system, wide service area is realized by providing unit communication service regions called as cells and establishing a service area as aggregate of the cells. The cell is defined as a range to be covered by one base station. On the other hand, since each base station has to cover a large number of user signals and so forth, a plurality of frequency carriers useful for communication are provided. For example, in an arrangement of frequency shown in FIG. 8, frequency carriers 401 and 402 can be used simultaneously by the same base station.

When the mobile station during communication moves within the service area, transition is caused from the current cell and a new and adjacent cell to perform switching of radio links in order to switch the base stations for establishing connection. For example, in FIG. 9, there is a case to switch communication link from a link 601 to a link 611. Transitional process to be caused upon switching of the radio links to connect is referred to as "hand over". Switching of the radio links will be caused even when the mobile station does not move. For example, when a quality of the link in connection is low, when a communication speed is desired to be varied but variation of the communication speed cannot be achieved by the link in current connection, or so forth, switching of links to connect can be caused between the radio links of the same base station having a plurality of carriers (between the links 601 and 603 in FIG. 9) or between the radio links of a plurality of the base stations in the case where a plurality of base stations have cells simultaneously covering a point where the mobile station presents.

On the other hand, when a frequency of the carrier used in communication in the radio link before switching and a frequency of the carrier used in communication in the radio link after switching, the hand over is particularly referred to as "different frequency hand over". In order to realize different frequency hand over, it becomes necessary to perform measurement of link quality in order to select a frequency carrier having high radio link quality as object for switching.

Conventional, in the case where own station has a period not performing transmission and reception, such as time division multiple access (TDMA), utilizing the vacant slot period, there is a method, in which a radio frequency is switched from the radio frequency in current communication to a frequency of measurement object for using quality measurement of the radio link of the different frequency carrier. In this method, since communication and measurement of the different frequency carrier are performed simultaneously, it can be adapted by switching of the radio frequency and it is not necessary to separately provide a radio machine for measuring the different frequency carrier.

On the other hand, in a system based on continuous transmission, such as frequency-division multiple access (FDMA) or code division multiple access (CDMA), there is a method to use two or more of plurality of radio machines, and to use the radio machine not used in communication for quality measurement of the radio link of other frequency carrier. As a method for not using two or more radio machines in CDMA, there has been proposed a Slotted mode (M. Gustafsson et al., "Compressed Mode Techniques for Inter-Frequency Measurements in a Wide-band DS-CDMA System", Proceedings of the $8^{th}$ PIMRC, September, 1997: First Prior Art). This is a system to compress a signal in time direction and to provide a vacant time having no data signal with maintaining a diffusing band unchanged by lowering spreading ratio over a plurality of time or elevating coding ratio of error correction coding, namely performing so-called puncturing.

FIG. 10 is an illustration showing an example of the case where the vacant period is provided. In FIG. 10, S1 to Sk+1 represent time slots. Referring to FIG. 10, there is shown one example, in which a signal transmission speed is increased to be double in comparison with those in periods T1 and T3 for compressing the signal into half in a time axis by lowering a spreading ratio in a period T2 into half. In a vacant period T4 thus obtained, a radio frequency is switched from a frequency carrier currently used for communication to another different frequency carrier to measure quality of the carrier.

On the other hand, there is another technology, in which a channel prediction (detection of amplitude information and phase information) is performed precisely by using a plurality of pilot blocks inserted in a transmission signal and a signal to noise power ratio is lowered for obtaining a necessary reception quality (bit error ratio or so forth) in synchronous or coherent detection ("Cannel Estimation Scheme Using the Plurality Pilot Blocks for DS-CDMA Mobile station", Shingaku Giho, The institute of Electronics. Information and Communication Engineers, Japan, August, 1996, pp 45 to 50).

On the other hand, there is a further method for controlling a transmission power in a reverse link in the mobile station by performing transmission with inserting the pilot signal in an information system string from the mobile station, measuring a quality (SIR: signal power to interference power ratio) of a reverse link by receiving the pilot signal in the base station, comparing the SIR with a target value and reporting a result of comparison to the mobile station.

Furthermore, the pilot signal is also used for controlling the transmission power of a forward link. Namely, in the mobile station, the pilot signal transmitted from the base station is received for measuring the quality of the forward link, the measured quality, i.e. SIR, is compared with the target value to report the comparison result to the base station. Then, according to the result of comparison, the transmission power in the forward link is controlled in the base station.

However, in case of the slotted mode set forth above, the information for controlling the transmission power of the reverse link cannot be transmitted during vacant period. Therefore, problem is encountered in degradation of characteristics of the reverse link. This problem will be discussed with reference to FIG. 9. It is assumed that the mobile station 620 connected to the base station 600 is performing communication using the link 601 as the forward link and the link 602 as the reverse link.

Structure of the transmission signal on the link 601 is illustrated in FIGS. 11A to 11E, for example. As shown in FIG. 11A, there is a super frame consisted of m in number of frames Fl to Fm. Each of the frames Fi is segmented into time slots S1 to Sn with a given interval as shown in FIG. 11B. Respective of the time slots Sj are in three kinds of forms as illustrated in FIGS. 11C to 11E. In FIG. 11C, a-pilot signal PL, a transmission power control signal TPC, a transmission rate information RI and transmission data D1 are arranged in sequential order from the leading end of the time slot.

In FIG. 11D, a pilot signal PL, a transmission rate information RI, transmission data D1, a transmission power control signal TPC and transmission data D2 are arranged in sequential order from the leading end of the time slot. In FIG. 11E, a transmission rate information RI, transmission data D1, a transmission power control signal TPC, transmission data D2 and a pilot signal PL are arranged in sequential order from the leading end of the time slot.

The pilot signal PL is a signal for synchronous detection and quality measurement as set forth above. The transmission power control signal TPC is a transmission power control information in the reverse link (e.g. reverse link 602). At this time, when the link 601 enters into a different frequency carrier measurement mode and thus enters into the vacant period T4 of FIG. 10, the transmission power control information of the reverse link 602 becomes not transmitted by the link 601, the transmission power of the mobile station 620 is offset from an appropriate level to cause degradation of the characteristics of the reverse link 602. This degradation becomes more significant at longer vacant period T4.

On the other hand, when reception using a plurality of pilot symbols is to be performed in the mobile station, reception using the former and later pilot symbols becomes impossible due to presence of the vacant period T4 to cause degradation of the reception quality. On the other hand, when transmission of the pilot signal from the base station is not effected, SIR measurement in the mobile station is not performed. As a result, the transmission power control of the forward link in the base station becomes impossible.

SUMMARY OF THE INVENTION

It is an object of the present invention to provide a mobile communication system, a communication control method, and a base station and a mobile, in which degradation of a transmission power control characteristics of a reverse link in a vacant period in a slotted mode, can be restricted to be small.

Another object of the present invention is to provide a mobile communication system, a communication control method, and a base station and a mobile, in which degradation of reception quality due to impossibility of reception using former and later pilot symbols upon reception using a plurality of pilot symbols.

A further object of the present invention is to invention to provide a mobile communication system, a communication control method, and a base station and a mobile which can prevent occurrence that the transmission power control in forward link due to impossibility of transmission of a pilot signal from the base station, becomes impossible.

According to the first aspect of the present invention, a mobile communication system comprising:

transmission control means for providing a vacant period, in which no communication data is present, in one or more of communication frames, and inserting a first control signal for maintaining a communication quality in the vacant period.

According to the second aspect according to the present invention, a mobile communication system comprising:

transmission control means for providing a vacant period, in which no communication data is present, in one or more of communication frames from a timing immediately after a second control signal for maintaining communication quality.

According to the third aspect according to the present invention, a mobile communication system comprising:

transmission control means for providing a vacant period in which no communication data is present, in one or more of communication frames, from a timing immediately after a second control signal for maintaining a communication quality, and transmitting a third control signal for maintaining the communication quality immediately after end of the vacant period, each of the second and third control signals being a pilot signal to be used for demodulation of the communication data or a transmission power control for a forward link.

According to the fourth aspect according to the present invention, a mobile communication system comprising:

transmission control means for providing a vacant period in which no communication data is present, in one or more of communication frames, from a timing immediately after a second control signal for maintaining a communication quality, and transmitting a third control signal for maintaining the communication quality immediately after end of the vacant period, the second control signal being a transmission power control for a reverse link and third control signal being a pilot signal to be used for demodulation of the communication data or a transmission power control for a forward link.

According to the fifth aspect according to the present invention, a communication control method mobile communication system comprising:

a step of providing a vacant period, in which no communication data is present, in one or more of communication frames, and a step of inserting a first control signal for maintaining a communication quality in the vacant period, for transmission.

According to the sixth aspect according to the present invention, a communication control method comprising:

step of transmitting a second control signal for maintaining a communication quality in one or more of communication frames; and step of providing a vacant period, in which no communication data is present, at a timing immediately after the second control signal.

According to the seventh aspect according to the present invention, a communication control method comprising:

step of providing a vacant period in which no communication data is present, in one or more of communication frames, from a timing immediately after a second control signal for maintaining a communication quality, and transmitting a third control signal for maintaining the communication quality immediately after end of the vacant period, the second and third control signal being a pilot signal to be used for demodulation of the communication data or a transmission power control for a forward link.

According to the eighth aspect according to the present invention, a communication control method comprising:

step of providing a vacant period in which no communication data is present, in one or more of communication frames, from a timing immediately after a second control signal for maintaining a communication quality, and transmitting a third control signal for maintaining the communication quality immediately after end of the vacant period, the second control signal being a transmission power control for a reverse link and third control signal being a pilot signal to be used for demodulation of the communication data or a transmission power control for a forward link.

According to the ninth aspect according to the present invention, a base station in a mobile communication system, comprising:

transmission control means for providing a vacant period, in which no communication data is present, in one or more of communication frames, and inserting a first control signal for maintaining a communication quality in the vacant period.

According to the tenth aspect according to the present invention, a base station in a mobile communication system, comprising:

transmission control means for providing a vacant period, in which no communication data is present, in one or more of communication frames from a timing immediately after a second control signal for maintaining communication quality.

According to the eleventh aspect according to the present invention, a base station in a mobile communication system, comprising:

transmission control means for providing a vacant period in which no communication data is present, in one or more of communication frames, from a timing immediately after a second control signal for maintaining a communication quality, and transmitting a third control signal for maintaining the communication quality immediately after end of the vacant period, the second and third control signal being a pilot signal to be used for demodulation of the communication data or a transmission power control for a forward link.

According to the twelfth aspect according to the present invention, a base station in a mobile communication system, comprising:

transmission control means for providing a vacant period in which no communication data is present, in one or more of communication frames, from a timing immediately after a second control signal for maintaining a communication quality, and transmitting a third control signal for maintaining the communication quality immediately after end of the vacant period, the second control signal being a transmission power control for a reverse link and third control signal being a pilot signal to be used for demodulation of the communication data or a transmission power control for a forward link.

According to the thirteenth aspect according to the present invention, a mobile station in a mobile communication system, comprising:

quality measuring means for receiving a first control signal for maintaining a communication quality transmitted in a vacant period in which no communication data is present, in one or more of communication frames and measuring a reception quality on the basis of the first control signal; and transmitting means for generating and transmitting a transmission power control information for a forward link according to the reception quality.

According to the fourteenth aspect according to the present invention, a mobile station in a mobile communication system, comprising:

demodulation means for receiving a first control signal for maintaining a communication quality transmitted in a vacant period in which no communication data is present, in one or more of communication frames and demodulating a communication data using the first control signal.

According to the fifteenth aspect according to the present invention, a mobile station in a mobile communication system, comprising:

means for receiving a first control signal for maintaining a communication quality transmitted in a vacant period in which no communication data is present, in one or more of communication frames and controlling a transmission power in a reverse link according to the first control signal.

According to the sixteenth aspect according to the present invention, a mobile station in a mobile communication system, comprising:

quality measuring means for receiving a second control signal for maintaining a communication quality transmitted at a timing immediately before a vacant period in which no communication data is present, in one or more of communication frames and measuring a reception quality on the basis of the second control signal; and transmitting means for generating and transmitting a transmission power control information for a forward link according to the reception quality.

According to the seventeenth aspect according to the present invention, a mobile station in a mobile communication system, comprising:

demodulation means for receiving a second control signal for maintaining a communication quality transmitted at a timing immediately before a vacant period in which no communication data is present, in one or more of communication frames and demodulating a communication data using the second control signal.

According to the eighteenth aspect according to the present invention, a mobile station in a mobile communication system, comprising:

means for receiving a second control signal for maintaining a communication quality transmitted at a timing immediately before a vacant period in which no communication data is present, in one or more of communication frames and controlling a transmission power in a reverse link on the basis of the second control signal.

According to the nineteenth aspect according to the present invention, a mobile station in a mobile communication system, comprising:

quality measuring means for receiving a second control signal for maintaining a communication quality transmitted at a timing immediately before a vacant period in which no communication data is present, in one or more of communication frames and receiving a third control signal for maintaining the communication quality transmitted at a timing immediately after the vacant period, and measuring a reception quality on the basis of the second or third control signal; and transmitting means for generating and transmitting a transmission power control information for a forward link according to the reception quality.

According to the twentieth aspect according to the present invention, a mobile station in a mobile communication system, comprising:

demodulation means for receiving a second control signal for maintaining a communication quality transmitted at a timing immediately before a vacant period in which no communication data is present, in one or more of communication frames and receiving a third control signal for maintaining the communication quality transmitted at a timing immediately after the vacant period, and demodulating a communication data using the second or third control signal.

According to the twenty-first aspect according to the present invention, a mobile station in a mobile communication system, comprising:

quality measuring means for receiving a second control signal for maintaining a communication quality transmitted at a timing immediately before a vacant period in which no communication data is present, in one or more of communication frames and receiving a third control signal for maintaining the communication quality transmitted at a timing immediately after the vacant period, and measuring a reception quality on the basis of the third control signal;

transmitting means for generating and transmitting a transmission power control information for a forward link according to the reception quality; and means for controlling a transmission power in a reverse link on the basis of the second control signal.

According to the twenty-second aspect according to the present invention, a mobile station in a mobile communication system, comprising:

demodulation means for receiving a second control signal for maintaining a communication quality transmitted at a timing immediately before a vacant period in which no communication data is present, in one or more of communication frames and receiving a third control signal for maintaining the communication quality transmitted at a timing immediately after the vacant period, and demodulating a communication data using the third control signal; and means for controlling a transmission power in a reverse link on the basis of the second control signal.

According to the twenty-third aspect according to the present invention, a mobile station in a mobile communication system, comprising:

demodulation means for receiving a second control signal for maintaining a communication quality transmitted at a timing immediately before a vacant period in which no communication data is present, in one or more of communication frames and receiving a third control signal for maintaining the communication quality transmitted at a timing immediately after the vacant period, and demodulating a communication data using the third control signal;

quality measuring means for measuring a reception quality on the basis of the third control signal;

transmitting means for generating and transmitting a transmission power control information in a forward link according to the reception quality; and means for controlling a transmission power in a reverse link on the basis of the second control signal.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a through understanding of the present invention. It will be obvious, however, to those skilled in the art that the present invention may be practiced without these specific details. In other instance, well-known structures are shown in detail in order to avoid unnecessarily obscure the present invention.

Figure 1:
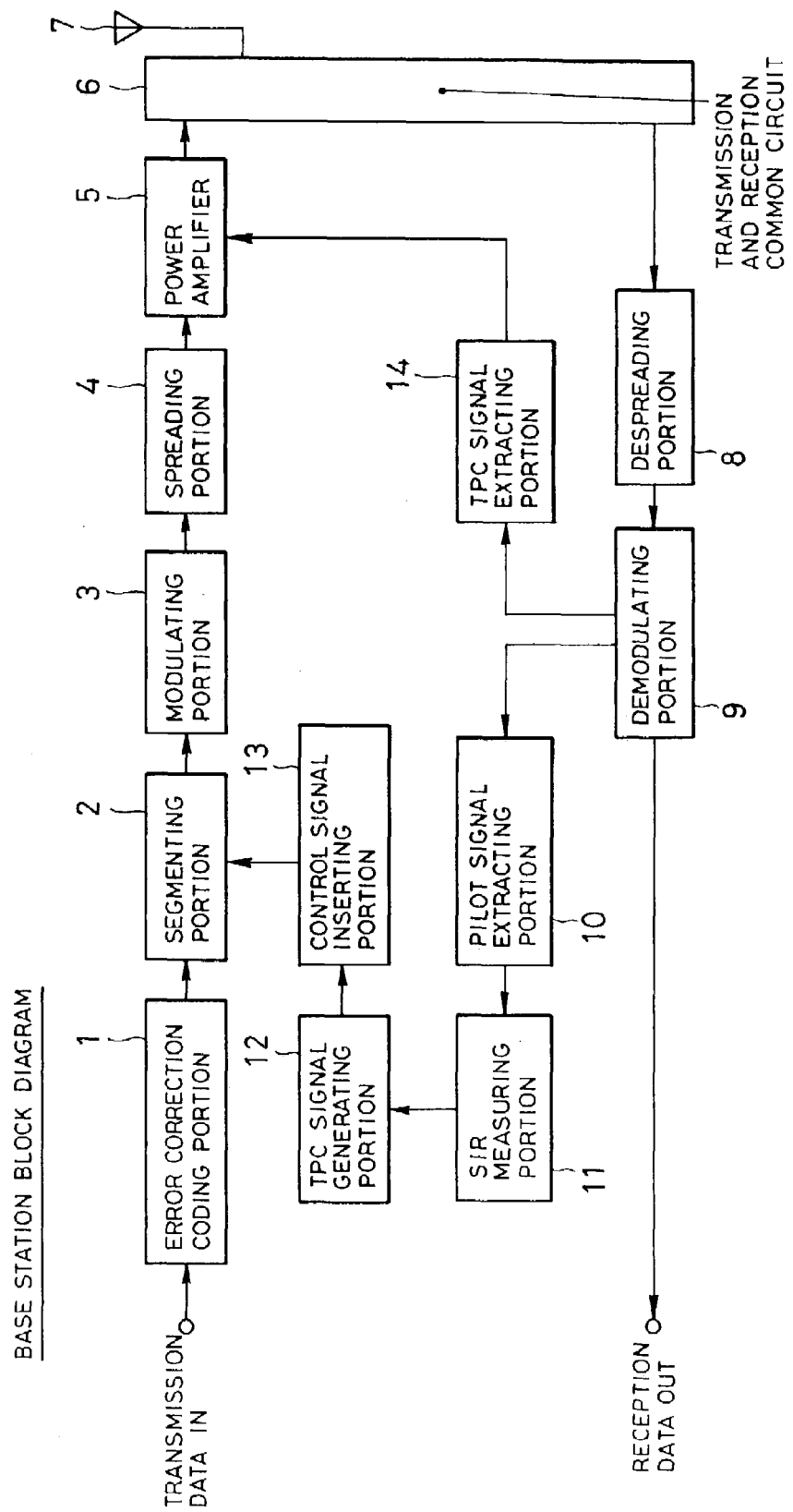
FIG. 1 is a block diagram of the preferred embodiment of a base station according to the present invention.
Figure 11:
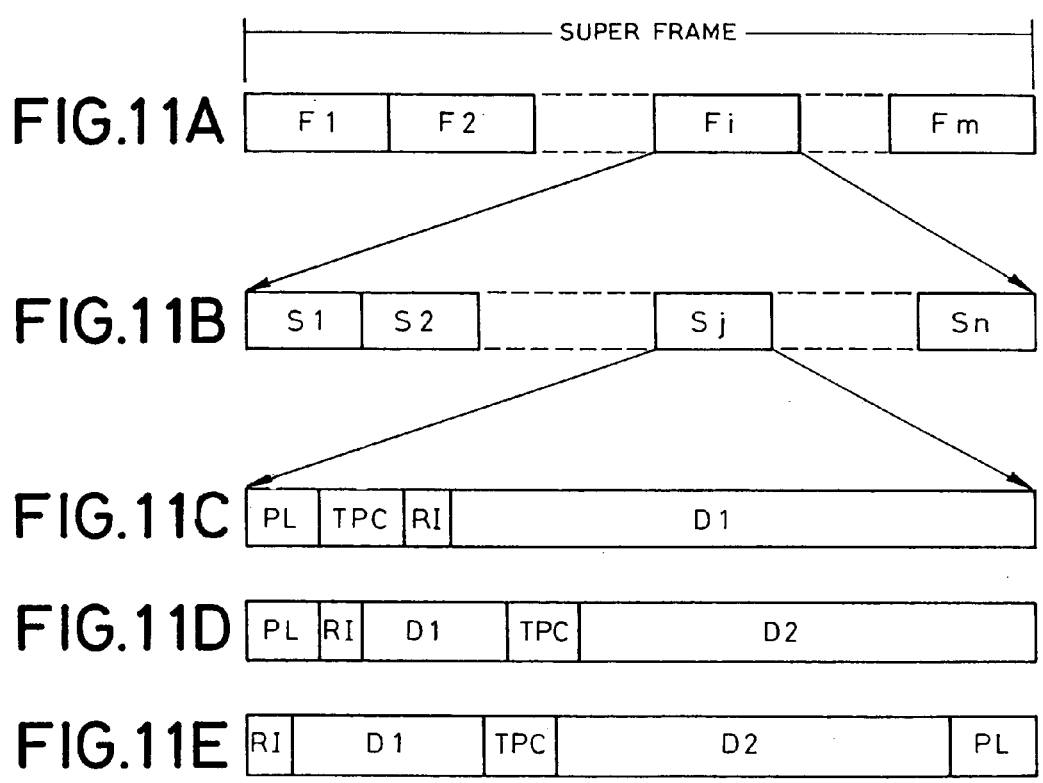
FIGS. 11A to 11E are illustrations showing examples of formats of a transmission signal of a forward link from the base station.

FIG. 1 is a block diagram of the preferred embodiment of a base station according to the present invention. An input transmission data is input to an error correction coding portion 1 for effecting error correction coding. The error correction codes thus generated are supplied to a segmenting portion 2. The segmenting portion 2 is responsive to the input error correction codes to generate slots as generated segments. In each slot, a pilot control signal PL, a transmission power control signal TPC, a transmission rate information RI and so forth, respectively shown in FIGS. 11C to 11E, are inserted at respectively predetermined positions. An output of the segmenting portion 2 is modulated by a modulating portion 3 and is supplied to an antenna 7 via a spreading portion 4, a power amplifier 5 and a transmission/reception common circuit 6, and transmitted therefrom.

A reception signal from a mobile station which will be discussed later, is supplied to a despreading portion 8 through the antenna 7, and the transmission/reception common circuit 6. Then, the reception signal is demodulated in a demodulating portion 9. A pilot signal extracting portion 10 extracts the pilot signal among the control signals from the demodulated output of the demodulating portion 9. Then, SIR measurement of the reverse link is performed by a SIR measuring portion 11. In a TPC signal generating portion 12, the measured SIR value and a targeted value are compared for generating a transmission power control information TPC for the reverse link on the basis of the result of comparison. The transmission power control information TPC is transmitted to a control signal inserting portion 13 to be inserted in respective segments together other control information, such as the pilot signal. On the other hand, by a TPC signal extracting portion 14, a transmission power control information TPC for a forward link is extracted from the output of the demodulator 9. On the basis of this transmission power control information TPC, gain control of the power amplifier 5 is performed.

Figure 10:
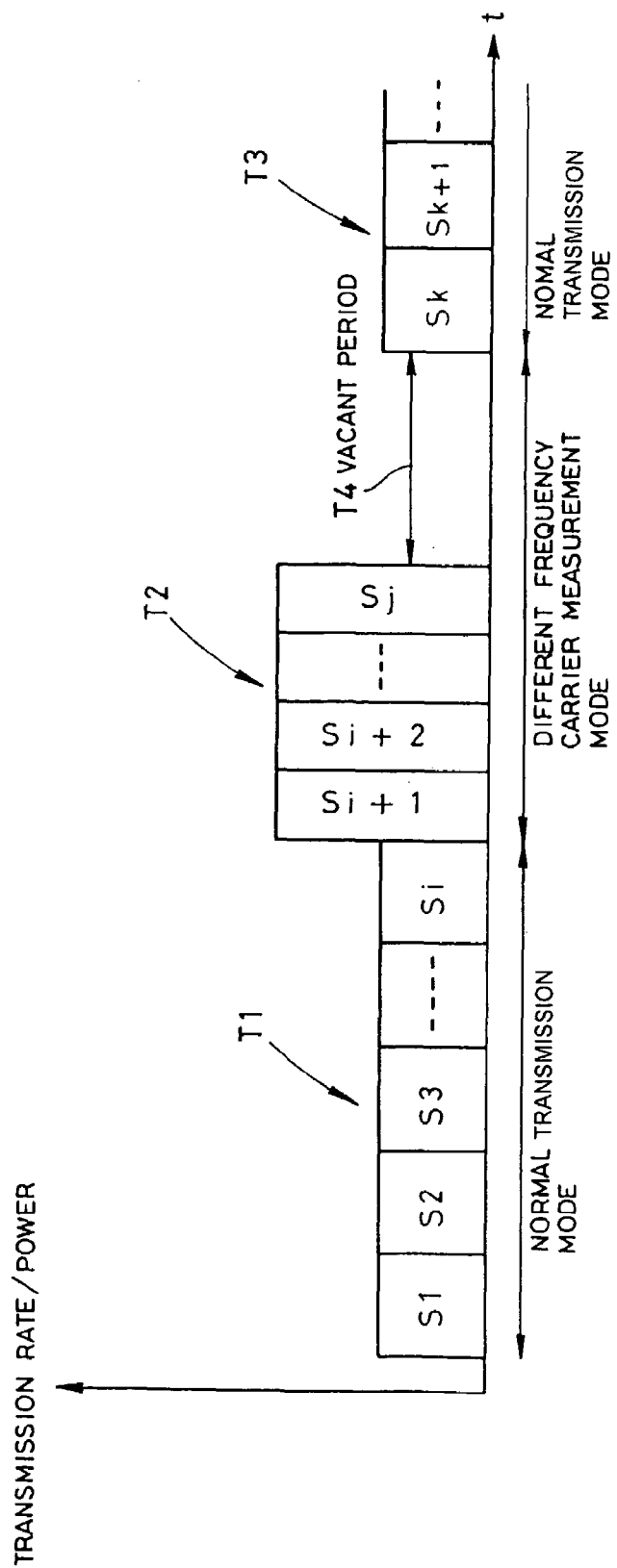
FIG. 10 is an illustration showing an example of a vacant period in the conventional slotted mode.

Here, as a method for generating a vacant period T4 shown in FIG. 10, there are a method by puncturing and a method by lowering a spreading ratio, as set forth above. The former method is a system for thinning data of sixteen time slots into data of fifteen time slots for example, by the error correction coding portion 1. By this, the vacant period for one slot can be produced. The later method of lowering the spreading rate is a system for compressing the signal into a half in a time axis link by increasing a transmission speed to be double, by lowering the spreading ratio to be one-half by segmenting the sixteen time slots into eight segments. This method can produce relatively long vacant period. Utilizing this vacant period, quality measurement of different frequency carrier or various other processes are performed in the mobile station. In the present invention, even in the vacant period, insertion of the control signal is performed by the control signal inserting portion 13.

Figure 2:
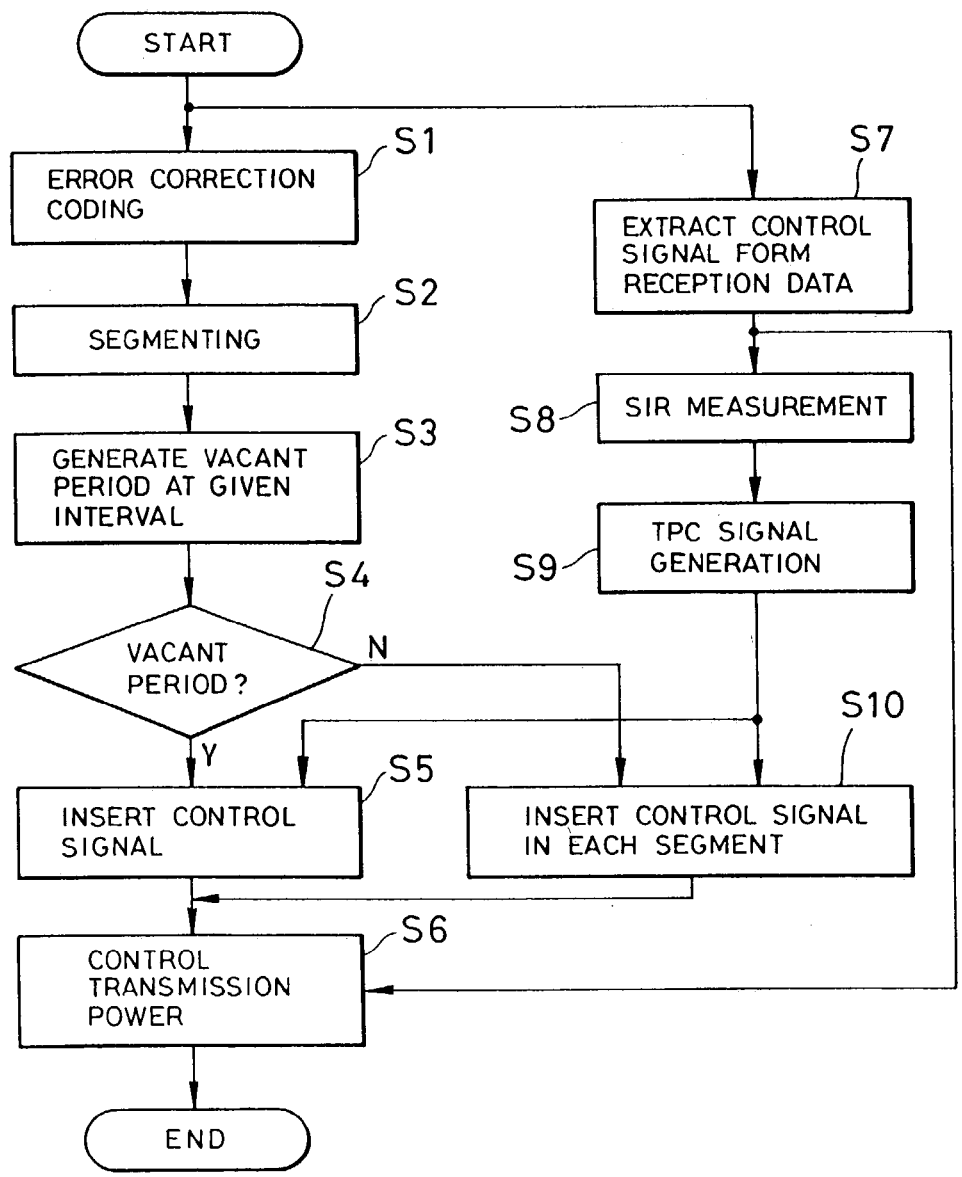
FIG. 2 is a flowchart showing an operation of the preferred embodiment of the base station of FIG. 1.

FIG. 2 is a flowchart generally showing operation of the base station shown in FIG. 1. Referring to FIG. 2, at first, in response to error correction coding of the transmission data (step S1), segmenting is performed (step S2). At this time, vacant periods are produced with a given interval (step S3) (step S5A, FIG. 12). Thereafter, insertion of the control signals to respective segments is performed during a normal data transmission period (steps S4 and S10) (step S6A, FIG. 12). The control signals are inserted in ten vacant period, immediately before the vacant period or immediately after the vacant period (steps S4 and S5). Then, transmission of signal is performed with performing the transmission power control (step S7A, FIG. 12).

On the other hand, the control signals are extracted from a received data (step S7), and SIR measurement is performed with the pilot signals in the control signals (step S8). The SIR value as a result of measurement is compared with the target value for generating the transmission power control information TPC for the reverse link on the basis of the result of comparison (step S9) (step S6A, FIG. 12). Together with another control signal such as the pilot signal, the transmission power control information TPC is inserted in respective of the segments and the vacant periods, respectively (steps S5 and S10). On the other hand, according to the transmission power control information TPC for the forward link extracted at step S7 (step S13A, FIG. 12), the transmission power control is performed (step S14A, FIG. 12).

Figure 3:
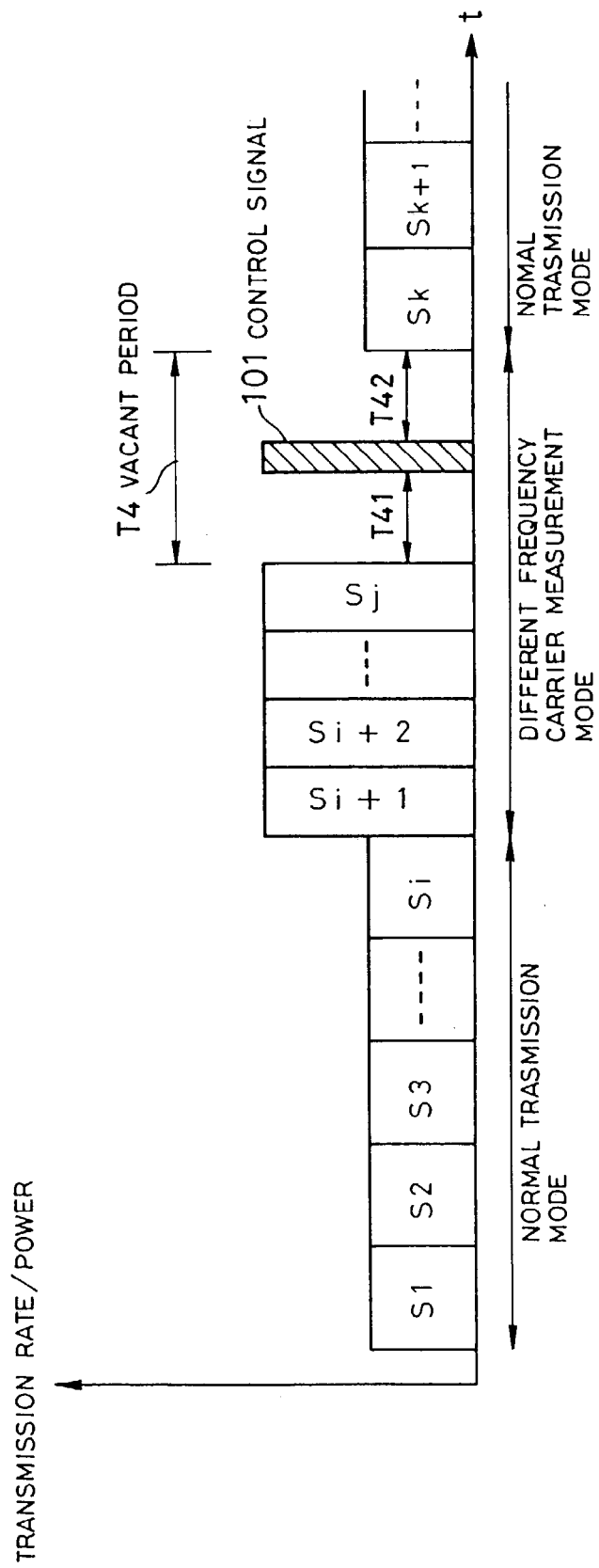
FIG. 3 is an illustration showing one example of insertion of a control signal in the preferred embodiment of the present invention.
Figure 4:
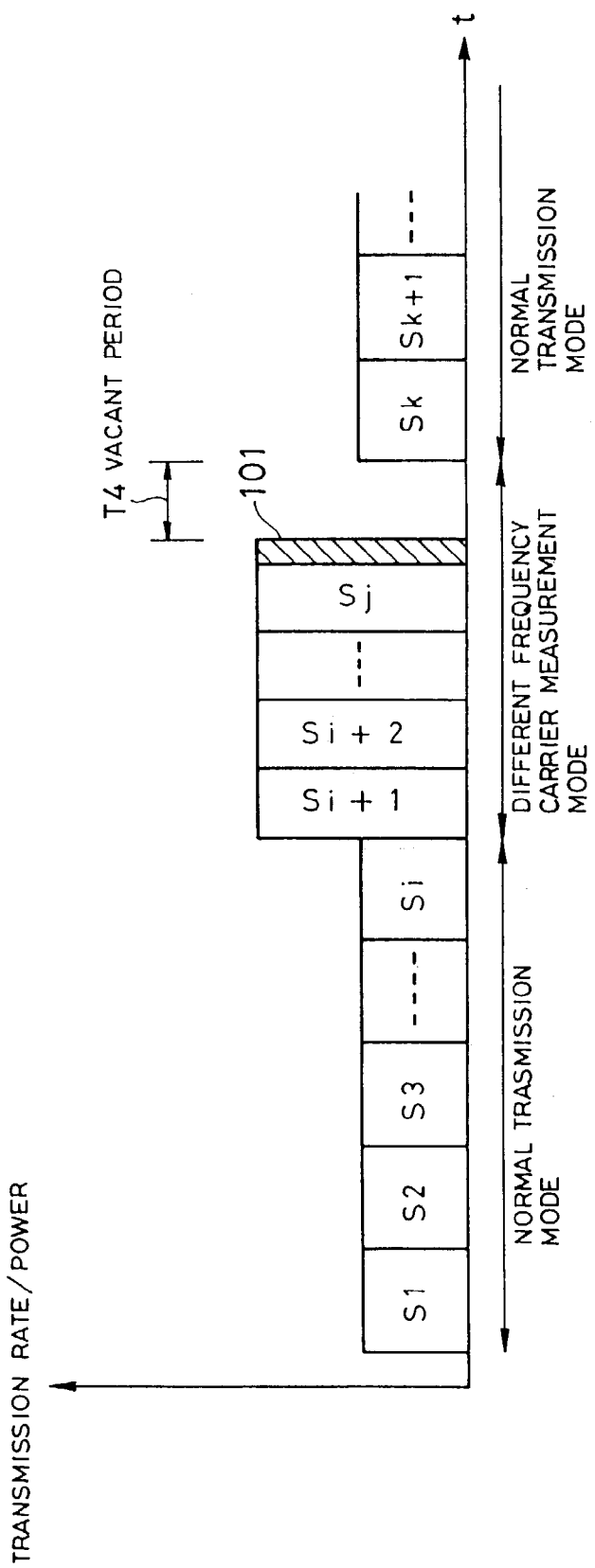
FIG. 4 is an illustration showing another example of insertion of a control signal in the preferred embodiment of the present invention.
Figure 5:
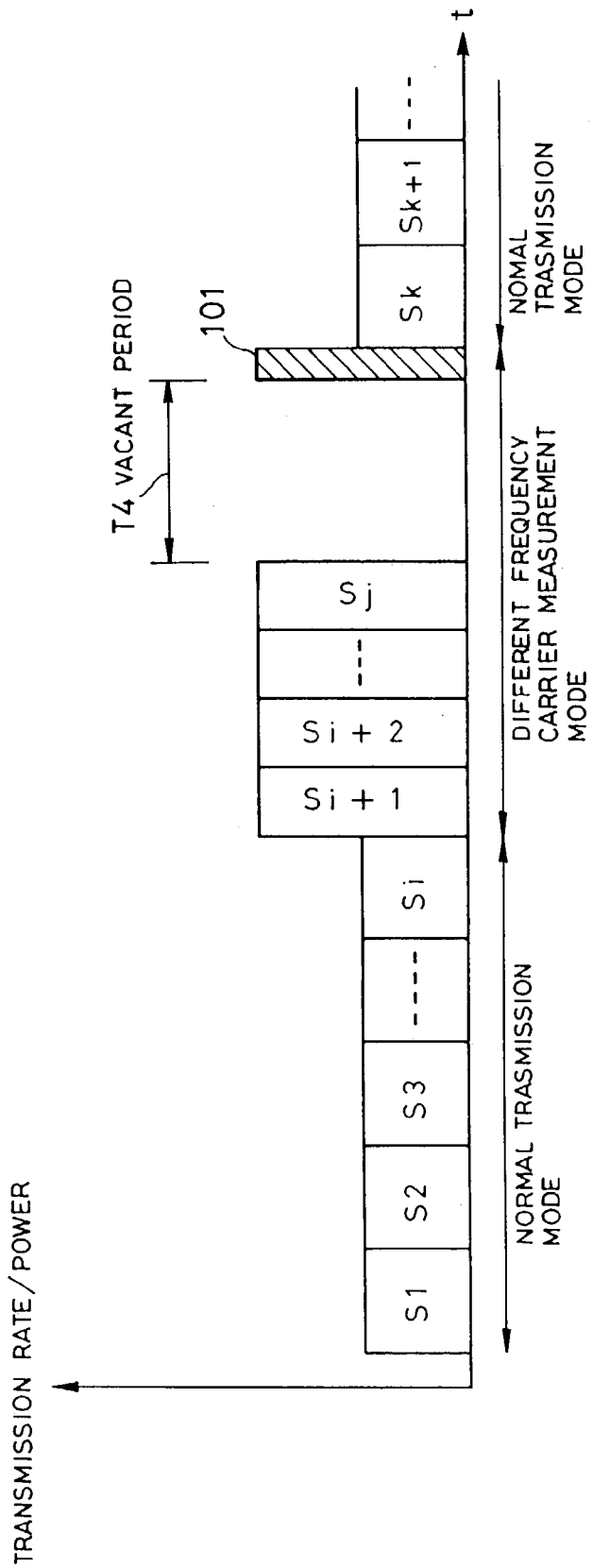
FIG. 5 is an illustration showing a further example of insertion of a control signal in the preferred embodiment of the present invention.

Various embodiments inserting the control signals into the vacant period are illustrated in FIGS. 3 to 5. The embodiment of FIG. 3 is particularly effective when the vacant period T4 is relatively long, which corresponds to the case where the vacant period is certainly provided by varying the spreading ratio in the slotted mode. When the vacant period is relatively long, instead of providing one series of vacant period, and if the process to be performed during the vacant period is quality measurement of the different frequency carrier, the vacant period is divided into sub-blocks T41, T42 of the period corresponding to minimum necessary period. Then, during an interval between the sub-blocks T41, T42, transmission of the control signal 101 is performed.

In FIG. 3, there is shown a case where the control signal transmission in the vacant period T4 is only once. However, it is obvious that transmission of the control signal is performed for a plurality of times. On the other hand, at this time, a transmission internal between a plurality of control signals to be inserted in the vacant period T4 may be set to be longer than a transmission interval of the same kind of control signals in the normal transmission mode.

In the embodiment of FIG. 4, the vacant period T4 is relatively short and is applicable for the case where quality measurement of the different frequency carrier is difficult to be performed during a period by dividing the vacant period into sub-blocks, for example. Mainly, obtaining the vacant period by puncturing in the slotted mode is the case. In the shown embodiment, before entering into the vacant period T4, transmission of the control signal 101 immediately after information signal transmission in the quality measurement mode of the different frequency carrier is performed. Thereafter, the process enters into that in the vacant period. Since the transmission power control for the reverse link is performed in response to the control signal, characteristics of the reverse link can be improved in comparison with the case where the process in the vacant period is entered immediately after information signal transmission as in the prior art.

The shown embodiment, as in the case of FIGS. 11C, 11D and 11E, is effective in a form of time slot where a part or all of control signals are present in the vicinity of the leading end of the slot where the vacant period T4 is started. The shown embodiment is the case where the vacant period T4 is short. However, it should be obvious that even when the vacant period is long, as shown in FIG. 4, the quality measurement of the different frequency carrier is initiated after transmission up to the control signal before entering into the vacant period without dividing the vacant period into the sub-blocks, as shown in FIG. 4.

Figure 13:
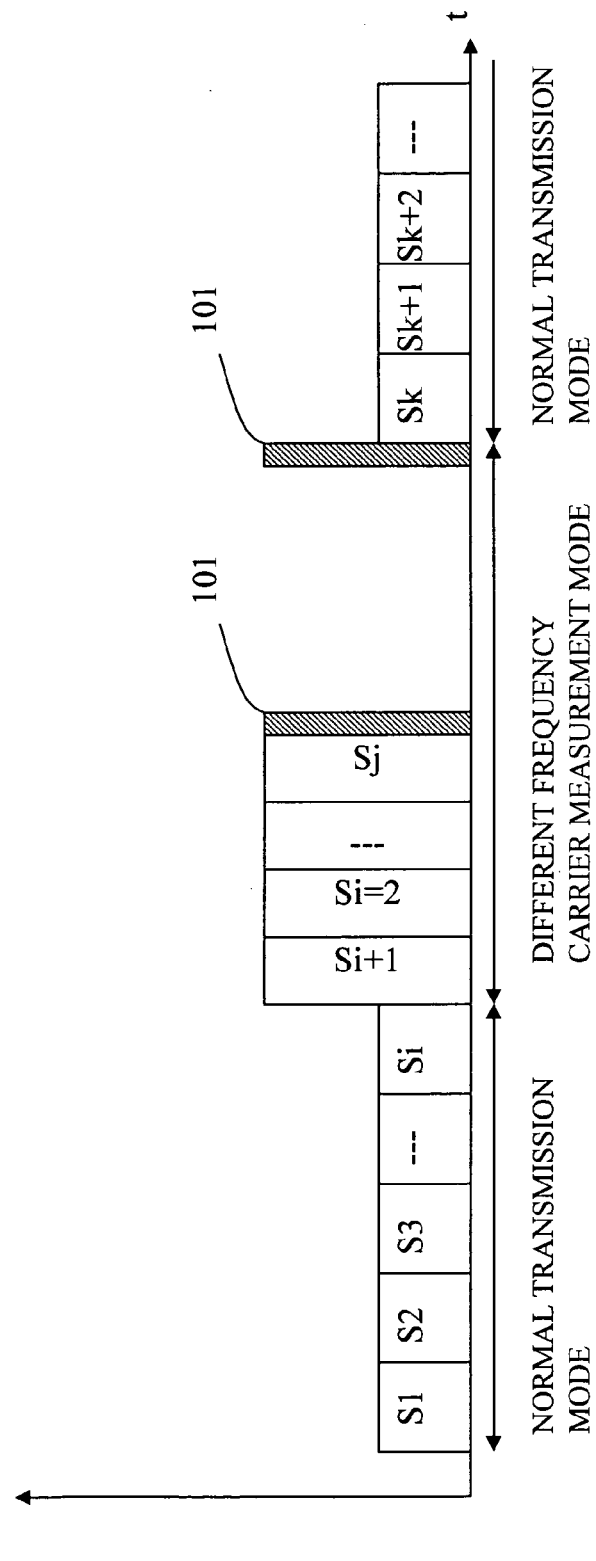
FIG. 13 illustrates an example of the insertion of two control signals according to an embodiment of the present invention.

In the embodiment shown in FIG. 5, the control signal 101 is inserted immediately after the vacant period T4. The shown embodiment is effect in case of the time slot form, in which a part or all of control signals are present at the trailing end of the time slot, at which the vacant period T4 ends, as in the case shown in FIG. 11E. It is, of course, possible in the shown embodiment, to insert the control signal at a given interval. On the other hand, it is also possible to perform control signal transmission even at immediately before the vacant period as shown in FIGS. 4 and 13 and to terminate transmission of the communication data for the mobile station which performs reception of the different frequency carrier, after the control signal transmission.

Figure 6:
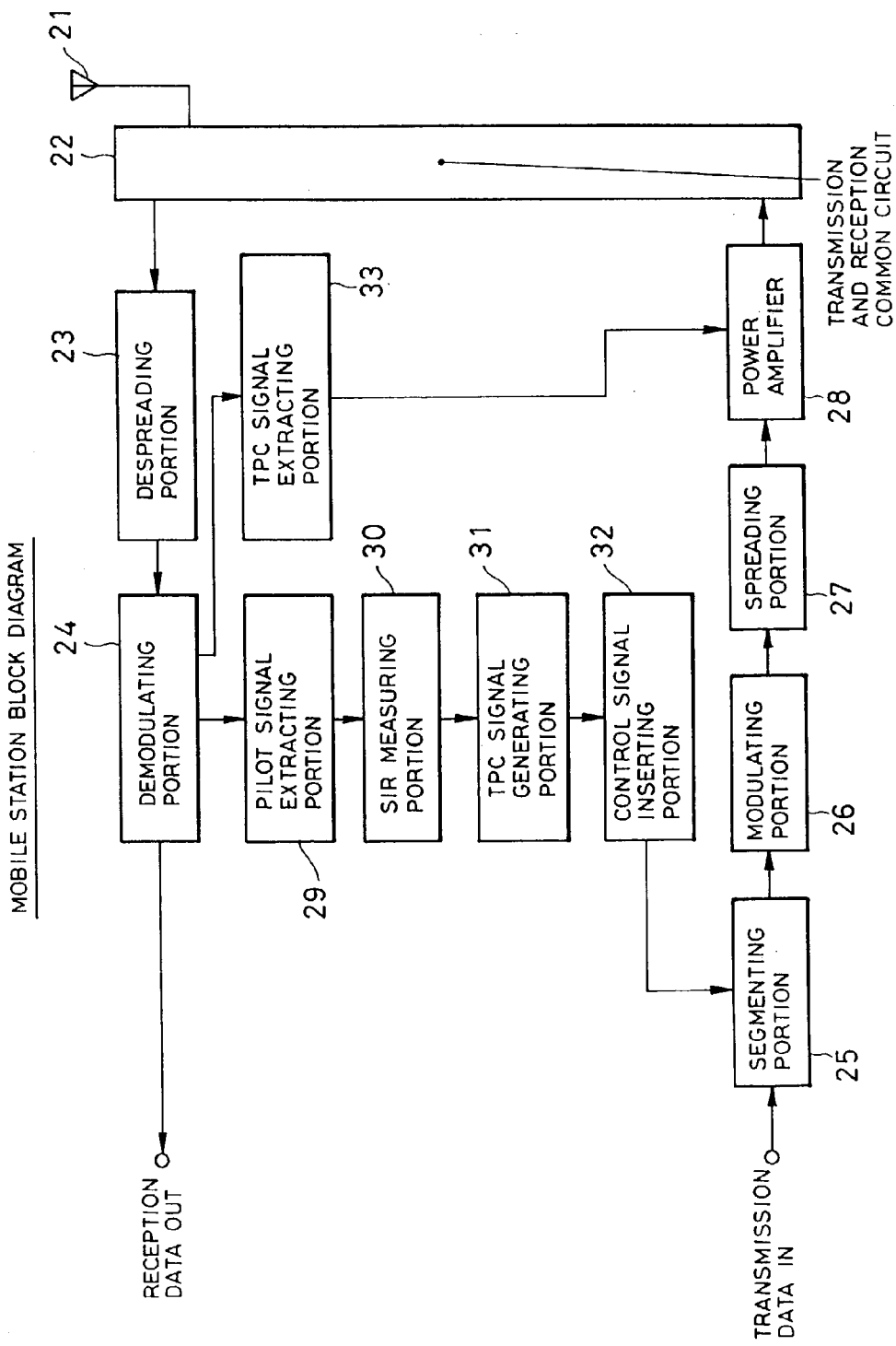
FIG. 6 is a block diagram of the preferred embodiment of a mobile station according to the present invention.

FIG. 6 is a block diagram of the preferred embodiment of a mobile station according to the present invention. Referring to FIG. 6, a reception signal from an antenna 21 (step S8A, FIG. 12) is input to a despreading portion 23 via a transmission and reception common circuit 22 to perform despreading process. An output of the despreading portion 23 is demodulated by a demodulating portion 24 for outputting a demodulated output. On the other hand, an input transmission data is segmented by a segmenting portion 25 and input to a modulating portion 26. An output of the modulating portion 26 is supplied to the transmission and reception common circuit 22 via a spreading circuit 27 and a power amplifier 28 and transmitted from the antenna 21.

Figure 12:
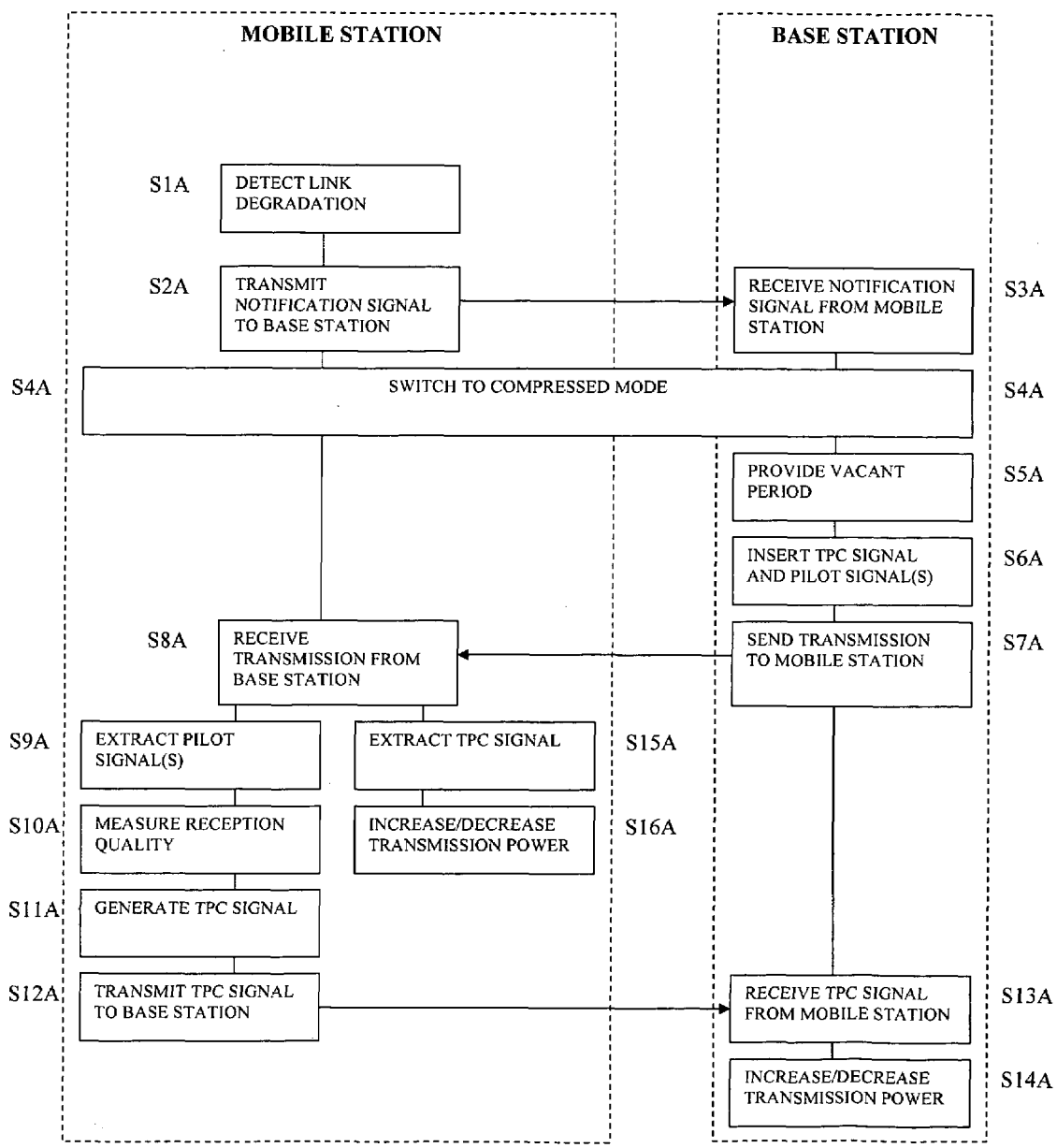
FIG. 12 is a flow chart illustrating a communication control method according to an exemplary embodiment of the present invention.

In a pilot signal extracting portion 29, a pilot signal is extracted from a signal output from the demodulating portion 24 and transmitted to a SIR measuring portion 30 (step S9A, FIG. 12). In the SIR measuring portion 30, SIR in the forward link is measured (step S10A, FIG. 12). In a TPC signal generating portion 31, the SIR as measured value and the target value are compared. A comparison result is inserted in each segment as the transmission power control signal TPC for forward link by the control signal inserting portion 32 together with the pilot signal as other control signals (steps S11A and S12A, FIG. 12).

On the other hand, in a TPC signal extracting portion 33, a transmission power control signal TPC for reverse link is extracted from the signal of the demodulating portion 24 (step S15A, FIG. 12). On the basis of the transmission power control signal TPC, a gain control of the power amplifier 28 is performed (step S16A, FIG. 12).

Figure 7:
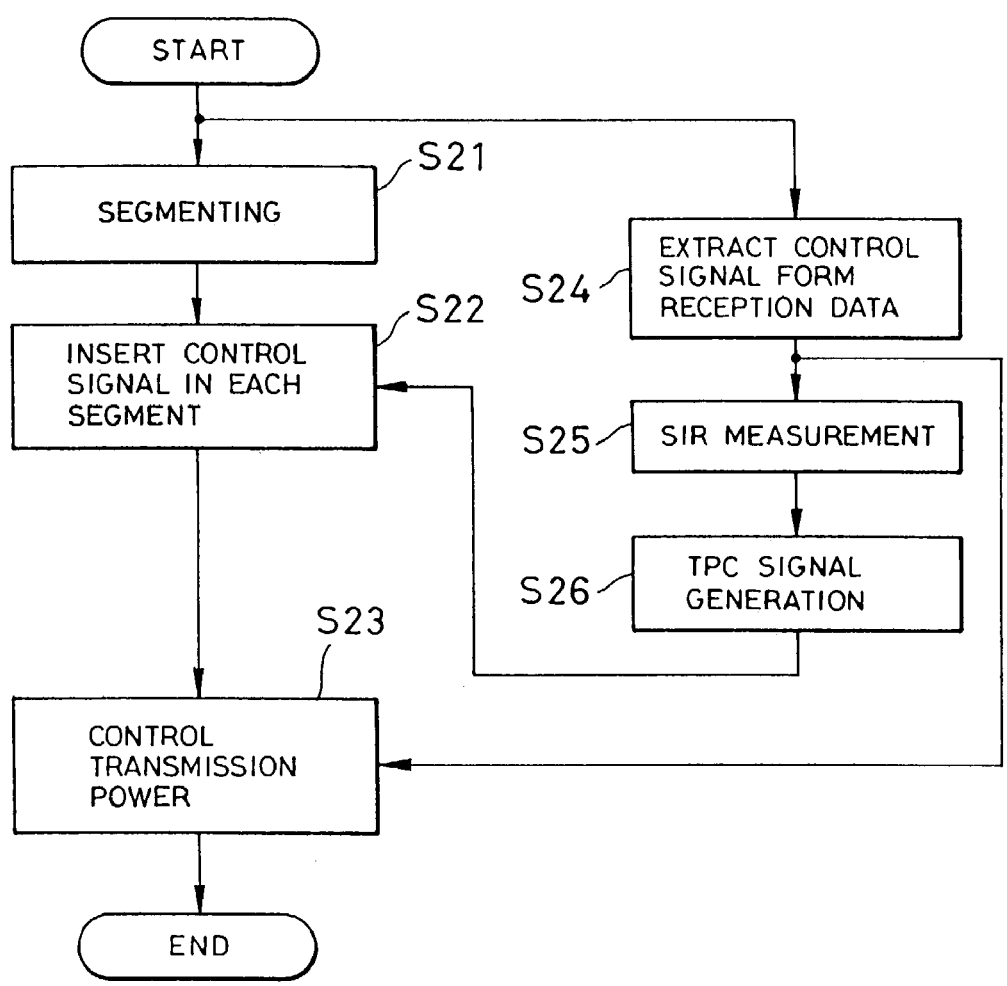
FIG. 7 is a flowchart showing operation of the preferred embodiment of the mobile station of FIG. 6.
Figure 8:
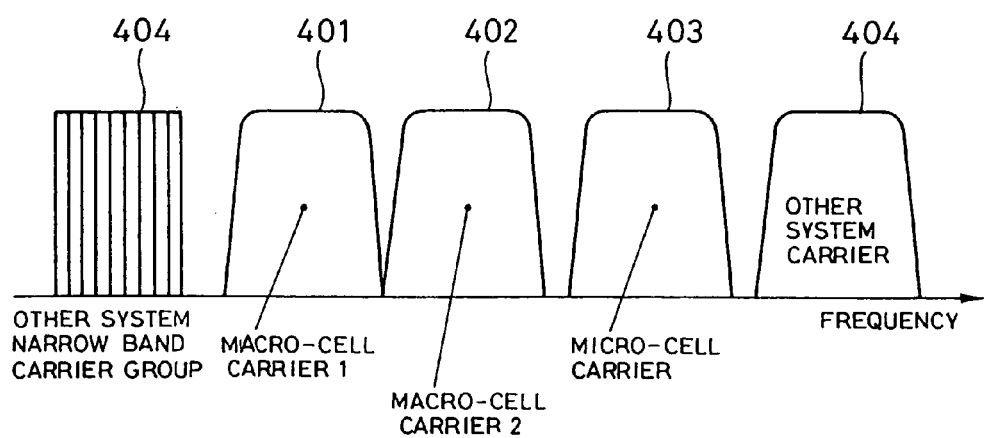
FIG. 8 is an illustration showing an example of arrangement of a frequency carrier.
Figure 9:
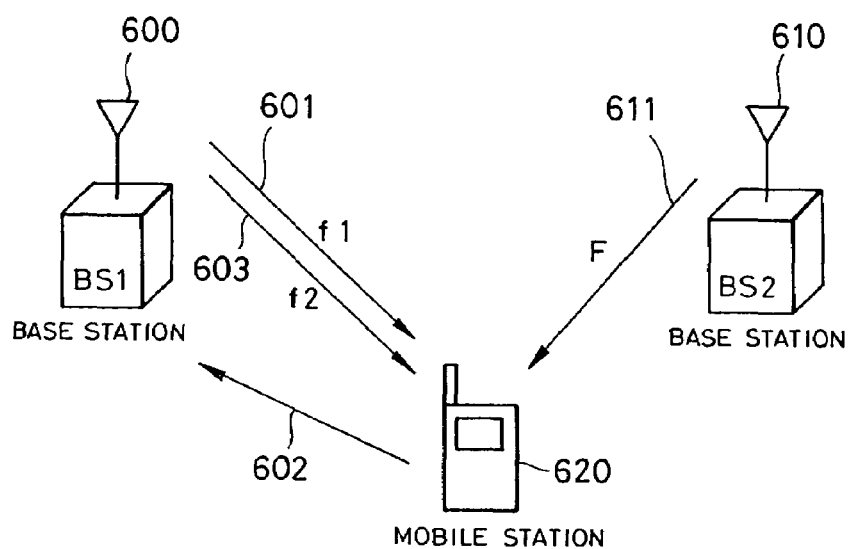
FIG. 9 is an illustration for explaining links between a base station and a mobile station.

FIG. 7 is a schematic block diagram showing operation of the mobile station shown in FIG. 6. Referring to FIG. 7, segmenting of the transmission data is performed (step S21). Then, the control signal is inserted to each segment (step S22). Then, transmission is performed with performing transmission power control (step S23).

On the other hand, extraction of the control signal from the received data is performed (step S24). By the pilot signal in the control signal, SIR measurement is performed (step S25). Comparison of the SIR value and the target value is performed. Then, on the basis of the result of comparison, the transmission power control signal TPC for forward link is generated (step S26). The generated transmission power control signal TPC is inserted into the segment at step S22. On the other hand, according to the transmission control signal TPC for the reverse link in the control signal extracted from the reception data, transmission power control is performed (step S23). Thus, transmission in reverse link is performed.

In the foregoing embodiment, discussion has been given that the pilot signal PL and the transmission power control information TPC are respectively contained as control signals for the reverse link and the forward link, In this case, control of the transmission power in both of the reverse link and the forward link can be performed. Particularly, even in the vacant period T4, by employing a construction, in which the pilot signal PL and the transmission power control information TPC are included as the control signals 101, transmission power control for the reverse link can be performed at higher frequency in the corresponding extent in the mobile station. Therefore, degradation of transmission power characteristics in the reverse link can be successfully alleviated, particularly.

On the other hand, as another embodiment, it is possible that only pilot signal PL is included in the control signal 101 in the vacant period T4. For example, as shown in FIGS. 11C and 11D, when the pilot signal PL is arranged at the leading end of the time slot, it is possible to terminate transmission of the communication data to the mobile station which performs reception of the different frequency carrier after transmission up to the pilot signal PL as the control signal immediately after transmission of the information signal, as shown in FIG. 4.

On the other hand, when the pilot signal PL is arranged at the trailing end of the time slot as shown in FIG. 1E, the pilot signal PL as the control signal immediately after the vacant period is inserted, and transmission is initiated from the inserted pilot signal, as shown in FIG. 5. In these case, the mobile station may demodulate the reception data immediately before the vacant period and the reception data immediately after the vacant period using the former and later pilot signals. Therefore, reception quality in the forward link can be improved.

On the other hand, the pilot signal PL transmitted from the base station is received by the mobile station. Then, with the pilot signal PL, SIR measurement is performed. The result of measurement is reported to the base station to enable control of the transmission power of the forward link in the base station. As a result, link quality in the forward link can be improved. Then, by transmitting the pilot signal immediately before termination of transmission (immediately before starting of the vacant period), SIR measurement is performed using the pilot signal in the mobile station. Thus, one greater number of transmission power control instruction can be transmitted to the base station to improve the transmission power control of the forward link.

On the other hand, it is possible to transmit the control signals at both of immediately before and immediately after vacant period. For example, in case of the time slot structure shown in FIG. 1E, the control signal inserted immediately before the vacant period can be the transmission power control information TPC and the control signal inserted immediately after the vacant period can be the pilot signal PL. In this case, the base station terminates transmission of the communication data to the mobile station which performs reception of the different frequency carrier after transmission of the transmission power control information TPC. Therefore, the transmission power control for the reverse link can be performed in the mobile station using the transmission power control information transmitted immediately before termination of the communication data in the base station. Therefore, degradation of quality of the reverse link can be successfully alleviated.

On the other hand, since the base station initiates transmission from the pilot signal PL, the mobile station can perform reception using the former and later pilot signal including the pilot signal transmitted initially upon starting of transmission of the communication data, upon reception of data immediately after the vacant period. Thus, reception quality of the forward line can be improved. Furthermore, the mobile station performs SIR measurement using the pilot signal PL immediately after vacant period, one greater number of transmission power control instruction can be transmitted to the base station to improve the transmission power control of the forward line.

Furthermore, as a timing of generation of the vacant period as the slotted mode, in addition to the method to generate the vacant period with a given internal as shown in step S3 of the flowchart in FIG. 2, a method to generate the vacant period depending upon a quality condition of the link by monitoring the link quality condition by the base station or the mobile station, can be considered. For example, the base station monitors link quality, such as frame error ratio of the signal from the mobile station, and issues notice for making the mobile station to measure the reception condition of other frequency carrier when the measured value exceeds the allowable value. Then, the base station enters into transmission mode including the vacant period. The mobile station is responsive to the notice to initiate control operation corresponding to the transmission mode.

On the other hand, similarly to the above, the mobile station monitors link quality, and issues a notice to the base station when the link quality degrades (steps S1A and S2A, FIG. 12). Responding to the notice, the base station enters into the transmission mode including the vacant period (steps S3A and S4A, FIG. 12). In conjunction therewith, the mobile station initiates control operation corresponding to the transmission mode. Furthermore, the base station monitors congestion of the link to generated the vacant period depending on the congestion condition. As a method for entering into the transmission mode with the vacant period by monitoring the congestion condition of the link by the base station, the base station monitors number of mobile stations in communication with own station. When the number of the mobile stations is in excess of the predetermined value, notice is issued for a past of the mobile stations in communication for making them to perform measurement of the reception condition of other frequency carrier. Then, the base station enters into the transmission mode with providing the vacant period for the mobile station which issued the notice. Then, the mobile station receiving the notice initiates control operation corresponding to the transmission mode.

As set forth above, according to the present invention, in the communication system performing transmission with generating the vacant period in the slotted mode during data transmission in order to perform various process, such as different frequency carrier quality measurement or so forth, since the control signal for maintaining the communication quality can be inserted even in the vacant period, link quality may not be degraded even if the vacant period is long.

Namely, when the pilot signal is used as the control signal, even in the vacant period, measurement of the link quality of the forward link with the pilot signal is performed in the mobile station to report the result of measurement to the base station. Therefore, transmission power control of the forward link can be performed according to the report in the base station. Therefore, degradation of the forward link can be eliminated.

Also, when reception is performed using a plurality of pilot signals in the mobile station, degradation of the communication which can be caused by impossibility of use of the former and later pilot signals, can be successfully prevented.

By transmitting the transmission power control information of the reverse link in addition to the pilot signal as the control signal, the mobile station may perform control of the transmission power of the reverse link using the transmission power control information even in the vacant period. Therefore, degradation of the link quality of the reverse link can be prevented.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should be understood as limited to the specific embodiment set out above but to include all possible embodiments which can be embodied within a scope encompassed and equivalents thereof with respect to the feature set out in the appended claims.

What is claimed is:
1. A communication control method, comprising:
compressing communication data, in a stream of communication data from a base station to a mobile station, in a time direction, thereby providing a vacant period, in which no communication data is present, in a data transmission from a base station to a mobile station;
inserting a transmission power control signal into the vacant period, such that both a beginning of the transmission power control signal and an end of the transmission power control signal are contiguous with a period in which no communication data is present;
performing inter-frequency measurement during the vacant period; and
before providing the vacant period,
transmitting a notification signal from the mobile station to the base station based on a detection of a degradation in reception quality, and
switching from a normal communication mode to a transmission mode having a vacant period based on the transmitted notification signal.

2. A communication control method, comprising:
compressing communication data, in a stream of communication data from a base station to a mobile station, in a time direction, thereby providing a vacant period, in which no communication data is present, in a data transmission from a base station to a mobile station;
inserting a transmission power control signal into the vacant period, such that both a beginning of the transmission power control signal and an end of the transmission power control signal are contiguous with a period in which no communication data is present;
inserting a pilot signal, such that a beginning of the pilot signal is contiguous with an end of a period in which communication data is present prior to the vacant period; and
performing inter-frequency measurement during the vacant period.

3. The communication control method according to claim 2, further comprising:
receiving the data transmission from the base station at the mobile station;
extracting the pilot signal from the received data transmission;
measuring a reception quality of the received data transmission on the basis of the extracted pilot signal;
generating a second transmission power control signal on the basis of the measured reception quality; and
transmitting the generated second transmission power control signal from the mobile station to the base station;
wherein the second transmission power control signal controls a transmission power of a signal from the base station to the mobile station.

4. The communication control method according to claim 2, further comprising:
before providing the vacant period,
transmitting a notification signal from the mobile station to the base station based on a detection of a degradation in reception quality, and
switching from a normal communication mode to a transmission mode having a vacant period based on the transmitted notification signal.

5. The communication control method according to one of claims 2, 3, and 4, further comprising:
receiving the data transmission from the base station at the mobile station;

extracting the transmission power control signal from the received data transmission;
controlling a transmission power of a signal from the mobile station to the base station based on the extracted transmission power control signal;
wherein the base station and the mobile station operate according to a Code Division Multiple Access (CDMA) system.

6. A communication control method, comprising:
compressing communication data, in a stream of communication data from a base station to a mobile station, in a time direction, thereby providing a vacant period, in which no communication data is present, in a data transmission from a base station to a mobile station;
inserting a transmission power control signal into the vacant period, such that both a beginning of the transmission power control signal and an end of the transmission power control signal are contiguous with a period in which no communication data is present;
inserting a first pilot signal, such that a beginning of the first pilot signal is contiguous with an end of a period in which communication data is present prior to the vacant period;
inserting a second pilot signal, such that an end of the second pilot signal is contiguous with a beginning of a period in which communication data is present after the vacant period;
performing inter-frequency measurement during the vacant period.

7. The communication control method according to claim 6, further comprising:
receiving the data transmission from the base station at the mobile station;
extracting at least one of the first and second pilot signals from the received data transmission;
measuring a reception quality of the received data transmission on the basis of the at least one extracted pilot signal;
generating a second transmission power control signal on the basis of the measured reception quality; and
transmitting the generated second transmission power control signal from the mobile station to the base station;
wherein the second transmission power control signal controls a transmission power of a signal from the base station to the mobile station.

8. The communication control method according to claim 6, further comprising:
before providing the vacant period,
transmitting a notification signal from the mobile station to the base station based on a detection of a degradation in reception quality, and
switching from a normal communication mode to a transmission mode having a vacant period based on the transmitted notification signal.

9. The communication control method according to one of claims 6, 7, and 8, further comprising:
receiving the data transmission from the base station at the mobile station;
extracting the transmission power control signal from the received data transmission;
controlling a transmission power of a signal from the mobile station to the base station based on the extracted transmission power control signal;
wherein the base station and the mobile station operate according to a Code Division Multiple Access (CDMA) system.

10. A communication control method, comprising:
compressing communication data, in a stream of communication data from a base station to a mobile station, in a time direction, thereby providing a vacant period, in which no communication data is present, in a data transmission from a base station to a mobile station;
inserting a transmission power control signal into the vacant period, such that both a beginning of the transmission power control signal and an end of the transmission power control signal are contiguous with a period in which no communication data is present;
inserting a pilot signal, such that an end of the pilot signal is contiguous with a beginning of a period in which communication data is present after the vacant period; and
performing inter-frequency measurement during the vacant period.

11. The communication control method according to claim 10, further comprising:
receiving the data transmission from the base station at the mobile station;
extracting the pilot signal from the received data transmission;
measuring a reception quality of the received data transmission on the basis of the extracted pilot signal;
generating a second transmission power control signal on the basis of the measured reception quality; and
transmitting the generated second transmission power control signal from the mobile station to the base station;
wherein the second transmission power control signal controls a transmission power of a signal from the base station to the mobile station.

12. The communication control method according to claim 10, further comprising:
before providing the vacant period,
transmitting a notification signal from the mobile station to the base station based on a detection of a degradation in reception quality, and
switching from a normal communication mode to a transmission mode having a vacant period based on the transmitted notification signal.

13. The communication control method according to one of claims 10, 11, and 12, further comprising:
receiving the data transmission from the base station at the mobile station;
extracting the transmission power control signal from the received data transmission;
controlling a transmission power of a signal from the mobile station to the base station based on the extracted transmission power control signal;
wherein the base station and the mobile station operate according to a Code Division Multiple Access (CDMA) system.

14. The communication control method according to claim 10, wherein the transmission from the base station to the mobile station includes a second pilot signal present within a data transmission prior to the vacant period, such that an end of the second pilot signal is contiguous with a beginning of the vacant period.

15. A communication control system, comprising:
a base station, comprising:
a first circuit which compresses communication data, in a stream of communication data from a base station to a mobile station, in a time direction, and thereby provides a vacant period, in which no communication data is present, in a data transmission from a base station to a mobile station, and a second circuit which inserts a transmission power control signal into the vacant period, such that both a beginning of the transmission power control signal and an end of the transmission power control signal are contiguous with a period in which no communication data is present; and a mobile station, comprising:

a transmission and reception circuit which receives data transmissions from the base station; and an SIR measuring portion which measures a reception quality of a received data transmission from the base station;

a circuit which performs inter-frequency measurement during the vacant period;

wherein the transmission and reception circuit further transmits a notification signal to the base station based on a detection of a degradation in reception quality; and wherein the base station further comprises:

a transmission and reception circuit which receives the notification signal from the mobile station;

wherein the first circuit provides the vacant period in response to the reception of the notification signal.

16. The communication control system according to claim 15, wherein the mobile station further comprises:

a transmission power control signal extracting portion which extracts the transmission power control signal from the received data transmission having the vacant period; and a power amplifier which controls a transmission power of a signal from the mobile station to the base station based on the extracted transmission power control signal; and wherein the communication control system is a Code Division Multiple Access (CDMA) system.

17. A communication control system, comprising: a base station, comprising:

a first circuit which compresses communication data, in a stream of communication data from a base station to a mobile station, in a time direction, and thereby provides a vacant period, in which no communication data is present, in a data transmission from a base station to a mobile station, and a second circuit which inserts a transmission power control signal into the vacant period, such that both a beginning of the transmission power control signal and an end of the transmission power control signal are contiguous with a period in which no communication data is present, and inserts a pilot signal, such that a beginning of the pilot signal is contiguous with an end of a period in which communication data is present prior to the vacant period; and a mobile station comprising:

a circuit which performs inter-frequency measurement during the vacant period.

18. The communication control system according to claim 17, further comprising:

a mobile station, comprising:

a transmission and reception circuit which receives data transmissions from the base station;

a transmission power control signal extracting portion which extracts the transmission power control signal from the received data transmission having the vacant period; and a power amplifier which controls a transmission power of a signal from the mobile station to the base station based on the extracted transmission power control signal.

19. The communication control system according to claim 17, further comprising:

a mobile station, comprising:

a transmission and reception circuit which receives data transmissions from the base station, a pilot signal extracting portion which extracts the pilot signal from the received data transmission having the vacant period, an SIR measuring portion which measures a reception quality of a received data transmission from the base station, on the basis of the extracted pilot signal, and a transmission power control signal generating portion which generates a second transmission power control signal, to be transmitted from the mobile station to the base station, on the basis of the measured reception quality;

wherein the second transmission power control signal controls transmission power of a signal from the base station to the mobile station.

20. The communication control system according to claim 17, further comprising:

a mobile station, comprising:

a transmission and reception circuit which receives data transmissions from the base station; and an SIR measuring portion which measures a reception quality of a received data transmission from the base station;

wherein the transmission and reception circuit further transmits a notification signal to the base station based on a detection of a degradation in reception quality; wherein the base station further comprises:

a transmission and reception circuit which receives the notification signal from the mobile station;

wherein the first circuit provides the vacant period in response to the reception of the notification signal.

21. The communication control system according to claim 19 or 20, wherein the mobile station further comprises:

a transmission power control signal extracting portion which extracts the transmission power control signal from the received data transmission having the vacant period; and a power amplifier which controls a transmission power of a signal from the mobile station to the base station based on the extracted transmission power control signal; and wherein the communication control system is a Code Division Multiple Access (CDMA) system.

22. A communication control system, comprising:

a base station, comprising:

a first circuit which compresses communication data, in a stream of communication data from a base station to a mobile station, in a time direction, and thereby provides a vacant period, in which no communication data is present, in a data transmission from a base station to a mobile station, and a second circuit which inserts a transmission power control signal into the vacant period, such that both a beginning of the transmission power control signal and an end of the transmission power control signal are contiguous with a period in which no communication data is present,
inserts a first pilot signal, such that a beginning of the first pilot signal is contiguous with an end of a period in which communication data is present prior to the vacant period, and
inserts a second pilot signal, such that an end of the second pilot signal is contiguous with a beginning of a period in which communication data is present after the vacant period; and
a mobile station comprising:
a circuit which performs inter-frequency measurement during the vacant period.

23. The communication control system according to claim 22, further comprising:
a mobile station, comprising:
a transmission and reception circuit which receives data transmissions from the base station;
a transmission power control signal extracting portion which extracts the transmission power control signal from the received data transmission having the vacant period; and
a power amplifier which controls a transmission power of a signal from the mobile station to the base station based on the extracted transmission power control signal.

24. The communication control system according to claim 22, further comprising:
a mobile station, comprising:
a transmission and reception circuit which receives data transmissions from the base station,
a pilot signal extracting portion which extracts at least one of the first and second pilot signals from the received data transmission having the vacant period,
an SIR measuring portion which measures a reception quality of a received data transmission from the base station, on the basis of the at least one extracted pilot signal, and
a transmission power control signal generating portion which generates a second transmission power control signal, to be transmitted from the mobile station to the base station, on the basis of the measured reception quality
wherein the second transmission power control signal controls transmission power of a signal from the base station to the mobile station.

25. The communication control system according to claim 22, further comprising:
a mobile station, comprising:
a transmission and reception circuit which receives data transmissions from the base station; and
an SIR measuring portion which measures a reception quality of a received data transmission from the base station;
wherein the transmission and reception circuit further transmits a notification signal to the base station based on a detection of a degradation in reception quality;
wherein the base station further comprises:
a transmission and reception circuit which receives the notification signal from the mobile station;
wherein the first circuit provides the vacant period in response to the reception of the notification signal.

26. The communication control system according to claim 24 or 25, wherein the mobile station further comprises:

a transmission power control signal extracting portion which extracts the transmission power control signal from the received data transmission having the vacant period; and
a power amplifier which controls a transmission power of a signal from the mobile station to the base station based on the extracted transmission power control signal; and
wherein the communication control system is a Code Division Multiple Access (CDMA) system.

27. A communication control system, comprising:
a base station, comprising:
a first circuit which compresses communication data, in a stream of communication data from a base station to a mobile station, in a time direction, and thereby provides a vacant period, in which no communication data is present, in a data transmission from a base station to a mobile station, and
a second circuit which
inserts a transmission power control signal into the vacant period, such that both a beginning of the transmission power control signal and an end of the transmission power control signal are contiguous with a period in which no communication data is present, and
inserts a pilot signal, such that an end of the pilot signal is contiguous with a beginning of a period in which communication data is present after the vacant period; and
a mobile station comprising:
a circuit which performs inter-frequency measurement during the vacant period.

28. The communication control system according to claim 27, further comprising:
a mobile station, comprising:
a transmission and reception circuit which receives data transmissions from the base station;
a transmission power control signal extracting portion which extracts the transmission power control signal from the received data transmission having the vacant period; and
a power amplifier which controls a transmission power of a signal from the mobile station to the base station based on the extracted transmission power control signal.

29. The communication control system according to claim 27, further comprising:
a mobile station, comprising:
a transmission and reception circuit which receives data transmissions from the base station,
a pilot signal extracting portion which extracts the pilot signal from the received data transmission having the vacant period,
an SIR measuring portion which measures a reception quality of a received data transmission from the base station, on the basis of the extracted pilot signal, and
a transmission power control signal generating portion which generates a second transmission power control signal, to be transmitted from the mobile station to the base station, on the basis of the measured reception quality
wherein the second transmission power control signal controls transmission power of a signal from the base station to the mobile station.

30. The communication control system according to claim 27, further comprising:
a mobile station, comprising:

a transmission and reception circuit which receives data transmissions from the base station; and
an SIR measuring portion which measures a reception quality of a received data transmission from the base station;
wherein the transmission and reception circuit further transmits a notification signal to the base station based on a detection of a degradation in reception quality;
wherein the base station further comprises:
a transmission and reception circuit which receives the notification signal from the mobile station;
wherein the first circuit provides the vacant period in response to the reception of the notification signal.

31. The communication control system according to claim 29 or 30, wherein the mobile station further comprises:
a transmission power control signal extracting portion which extracts the transmission power control signal from the received data transmission having the vacant period; and
a power amplifier which controls a transmission power of a signal from the mobile station to the base station based on the extracted transmission power control signal; and
wherein the communication control system is a Code Division Multiple Access (CDMA) system.

32. The communication control system according to claim 27, wherein the transmission from the base station to the mobile station includes a second pilot signal present within a data transmission prior to the vacant period, such that an end of the second pilot signal is contiguous with a beginning of the vacant period.

33. A mobile station in a mobile communication system, comprising:
a transmission and reception circuit which receives data transmissions from a base station;
wherein at least one of the received data transmissions includes:
a vacant period in which no communication data is present, and
a transmission power control signal inserted into the vacant period, such that both a beginning of the transmission power control signal and an end of the transmission power control signal are contiguous with a period in which no communication data is present;
a circuit which performs inter-frequency measurement during the vacant period;
an SIR measuring portion which measures a reception quality of a received data transmission from the base station; and
a notification circuit which, upon a detection of a degradation in reception quality, transmits a notification signal to the base station to switch from a normal communication mode to a transmission mode having a vacant period;
wherein communication data in the data transmission from the base station is compressed in a time direction and thereby, the vacant period is provided.

34. A mobile station in a mobile communication system, comprising:
a transmission and reception circuit which receives data transmissions from a base station;
wherein at least one of the received data transmissions includes:
a vacant period in which no communication data is present,
a transmission power control signal inserted into the vacant period, such that both a beginning of the transmission power control signal and an end of the transmission power control signal are contiguous with a period in which no communication data is present, and
a pilot signal inserted such that a beginning of the pilot signal is contiguous with an end of a period in which communication data is present prior to the vacant period; and a circuit which performs inter-frequency measurement during the vacant period;
wherein communication data in the data transmission from the base station is compressed in a time direction and thereby, the vacant period is provided.

35. The mobile station according to claim 34, further comprising:
a pilot signal extracting portion which extracts the pilot signal from the received data transmission having the vacant period;
an SIR measuring portion which measures a reception quality of a received data transmission from the base station, on the basis of the extracted pilot signal; and
a transmission power control signal generating portion which generates a second transmission power control signal, to be transmitted to the base station, on the basis of the measured reception quality;
wherein the second transmission power control signal controls transmission power of a signal from the base station to the mobile station.

36. The mobile station according to claim 34, further comprising:
an SIR measuring portion which measures a reception quality of a received data transmission from the base station; and
a notification circuit which, upon a detection of a degradation in reception quality, transmits a notification signal to the base station to switch from a normal communication mode to a transmission mode having a vacant period.

37. The mobile station according to one of claims 34, 35, and 36, further comprising:
a transmission power control signal extracting portion which extracts the transmission power control signal from the received data transmission having the vacant period; and
a power amplifier which controls a transmission power of a signal from the mobile station to the base station based on the extracted transmission power control signal;
wherein the mobile station operates according to a Code Division Multiple Access (CDMA) system.

38. A mobile station in a mobile communication system, comprising:
a transmission and reception circuit which receives data transmissions from a base station;
wherein at least one of the received data transmissions includes:
a vacant period in which no communication data is present,
a transmission power control signal inserted into the vacant period, such that both
a beginning of the transmission power control signal and an end of the transmission power control signal are contiguous with a period in which no communication data is present, a first pilot signal inserted such that a beginning of the first pilot signal is contiguous with an end of a period in which communication data is present prior to the vacant period, and a second pilot signal inserted such that an end of the second pilot signal is contiguous with a beginning of a period in which communication data is present after the vacant period; and a circuit which performs inter-frequency measurement during the vacant period;

wherein communication data in the data transmission from the base station is compressed in a time direction and thereby, the vacant period is provided.

39. The mobile station according to claim 38, further comprising:

a pilot signal extracting portion which extracts at least one of the first and second pilot signals from the received data transmission having the vacant period, an SIR measuring portion which measures a reception quality of a received data transmission from the base station, on the basis of the at least one extracted pilot signal, and a transmission power control signal generating portion which generates a second transmission power control signal, to be transmitted from the mobile station to the base station, on the basis of the measured reception quality wherein the second transmission power control signal controls transmission power of a signal from the base station to the mobile station.

40. The mobile station according to claim 38, further comprising:

an SIR measuring portion which measures a reception quality of a received data transmission from the base station; and a notification circuit which, upon a detection of a degradation in reception quality, transmits a notification signal to the base station to switch from a normal communication mode to a transmission mode having a vacant period.

41. The mobile station according to one of claims 38, 39, and 40, further comprising:

a transmission power control signal extracting portion which extracts the transmission power control signal from the received data transmission having the vacant period; and a power amplifier which controls a transmission power of a signal from the mobile station to the base station based on the extracted transmission power control signal;

wherein the mobile station operates according to a Code Division Multiple Access (CDMA) system.

42. A mobile station in a mobile communication system, comprising:

a transmission and reception circuit which receives data transmissions from a base station;

wherein at least one of the received data transmissions includes:

a vacant period in which no communication data is present, a transmission power control signal inserted into the vacant period, such that both a beginning of the transmission power control signal and an end of the transmission power control signal are contiguous with a period in which no communication data is present, and a pilot signal inserted such that an end of the pilot signal is contiguous with a beginning of a period in which communication data is present after the vacant period; and a circuit which performs inter-frequency measurement during the vacant period;

wherein communication data in the data transmission from the base station is compressed in a time direction and thereby, the vacant period is provided.

43. The mobile station according to claim 42, further comprising:

a pilot signal extracting portion which extracts the pilot signal from the received data transmission having the vacant period, an SIR measuring portion which measures a reception quality of a received data transmission from the base station, on the basis of the extracted pilot signal, and a transmission power control signal generating portion which generates a second transmission power control signal, to be transmitted from the mobile station to the base station, on the basis of the measured reception quality wherein the second transmission power control signal controls transmission power of a signal from the base station to the mobile station.

44. The mobile station according to claim 42, further comprising:

an SIR measuring portion which measures a reception quality of a received data transmission from the base station; and a notification circuit which, upon a detection of a degradation in reception quality, transmits a notification signal to the base station to switch from a normal communication mode to a transmission mode having a vacant period.

45. The mobile station according to one of claims 42, 43, and 44, further comprising:

a transmission power control signal extracting portion which extracts the transmission power control signal from the received data transmission having the vacant period; and a power amplifier which controls a transmission power of a signal from the mobile station to the base station based on the extracted transmission power control signal;

wherein the mobile station operates according to a Code Division Multiple Access (CDMA) system.

46. The control method according to claim 43, wherein the at least one transmission from the base station to the mobile station includes a second pilot signal present within a data transmission prior to the vacant period, such that an end of the second pilot signal is contiguous with a beginning of the vacant period.

47. A control method of a mobile station in a mobile communication system, comprising:

receiving data transmissions from a base station, wherein at least one of the received data transmissions includes:

a vacant period in which no communication data is present, and a transmission power control signal inserted into the vacant period, such that both a beginning of the transmission power control signal and an end of the transmission power control signal are contiguous with a period in which no communication data is present;

extracting the transmission power control signal from the received data transmission having the vacant period;

increasing or decreasing transmission power of the mobile station based on the extracted transmission power control signal;
performing inter-frequency measurement during the vacant period; and
prior to receiving the data transmission having the vacant period from the base station,
    measuring a reception quality of a received data transmission from the base station; and
    upon the detection of a degradation in reception quality, transmitting a notification signal to the base station to switch from a normal communication mode to a transmission mode having a vacant period;
wherein communication data in the data transmission from the base station is compressed in a time direction, and thereby the vacant period is provided; and
wherein the mobile station operates according to a Code Division Multiple Access (CDMA) system.

48. A control method of a mobile station in a mobile communication system, comprising:
receiving data transmissions from a base station, wherein at least one of the received data transmissions includes:
    a vacant period in which no communication data is present,
    a transmission power control signal inserted into the vacant period, such that both a beginning of the transmission power control signal and an end of the transmission power control signal are contiguous with a period in which no communication data is present, and
    a pilot signal inserted such that a beginning of the pilot signal is contiguous with an end of a period in which communication data is present prior to the vacant period;
extracting the transmission power control signal from the received data transmission having the vacant period;
increasing or decreasing transmission power of the mobile station based on the extracted transmission power control signal; and
performing inter-frequency measurement during the vacant period;
wherein communication data in the data transmission from the base station is compressed in a time direction, and thereby the vacant period is provided; and
wherein the mobile station operates according to a Code Division Multiple Access (CDMA) system.

49. The control method according to claim 48, further comprising:
extracting the pilot signal from the received data transmission having the vacant period;
measuring a reception quality of a received data transmission from the base station, on the basis of the extracted pilot signal;
generating a second transmission power control signal on the basis of the measured reception quality; and
transmitting the generated second transmission power control signal to the base station.

50. The control method according to claim 48, further comprising:
prior to receiving the data transmission having the vacant period from the base station,
    measuring a reception quality of a received data transmission from the base station; and
    upon the detection of a degradation in reception quality, transmitting a notification signal to the base station to switch from a normal communication mode to a transmission mode having a vacant period.

51. A control method of a mobile station in a mobile communication system, comprising:
receiving data transmissions from a base station, wherein at least one of the received data transmissions includes:
    a vacant period in which no communication data is present,
    a transmission power control signal inserted into the vacant period, such that both a beginning of the transmission power control signal and an end of the transmission power control signal are contiguous with a period in which no communication data is present,
    a first pilot signal inserted such that a beginning of the first pilot signal is contiguous with an end of a period in which communication data is present prior to the vacant period, and
    a second pilot signal inserted such that an end of the second pilot signal is contiguous with a beginning of a period in which communication data is present after the vacant period;
extracting the transmission power control signal from the received data transmission having the vacant period; and
increasing or decreasing transmission power of the mobile station based on the extracted transmission power control signal; and
performing inter-frequency measurement during the vacant period;
wherein communication data in the data transmission from the base station is compressed in a time direction, and thereby the vacant period is provided; and
wherein the mobile station operates according to a Code Division Multiple Access (CDMA) method.

52. The control method according to claim 51, further comprising:
extracting at least one of the first and second pilot signals from the received data transmission having the vacant period,
measuring a reception quality of a received data transmission from the base station, on the basis of the at least one extracted pilot signal
generating a second transmission power control signal on the basis of the measured reception quality; and
transmitting the generated second transmission power control signal to the base station.

53. The control method according to claim 51, further comprising:
prior to receiving the data transmission having the vacant period from the base station,
    measuring a reception quality of a received data transmission from the base station; and
    upon the detection of a degradation in reception quality, transmitting a notification signal to the base station to switch from a normal communication mode to a transmission mode having a vacant period.

54. A control method of a mobile station in a mobile communication system, comprising:
receiving data transmissions from a base station, wherein at least one of the received data transmissions includes:
    a vacant period in which no communication data is present,
    a transmission power control signal inserted into the vacant period, such that both a beginning of the transmission power control signal and an end of the transmission power control signal are contiguous with a period in which no communication data is present, and a pilot signal inserted such that an end of the pilot signal is contiguous with a beginning of a period in which communication data is present after the vacant period;
extracting the transmission power control signal from the received data transmission having the vacant period; and
increasing or decreasing transmission power of the mobile station based on the extracted transmission power control signal; and
performing inter-frequency measurement during the vacant period;
wherein communication data in the data transmission from the base station is compressed in a time direction, and thereby the vacant period is provided; and
wherein the mobile station operates according to a Code Division Multiple Access (CDMA) method.

55. The control method according to claim 54, further comprising:
extracting the pilot signal from the received data transmission having the vacant period;
measuring a reception quality of a received data transmission from the base station, on the basis of the extracted pilot signal;
generating a second transmission power control signal on the basis of the measured reception quality; and
transmitting the generated second transmission power control signal to the base station.

56. The control method according to claim 54, further comprising:
prior to receiving the data transmission having the vacant period from the base station,
measuring a reception quality of a received data transmission from the base station; and
upon the detection of a degradation in reception quality, transmitting a notification signal to the base station to switch from a normal communication mode to a transmission mode having a vacant period.

57. The mobile station according to claim 54, wherein the at least one transmission from the base station to the mobile station includes a second pilot signal present within a data transmission prior to the vacant period, such that an end of the second pilot signal is contiguous with a beginning of the vacant period.

58. A communication control system, comprising:
a base station, comprising:
means for compressing communication data, in a stream of communication data from the base station to a mobile station, in a time direction, thereby providing a vacant period, in which no communication data is present, in a data transmission from the base station to a mobile station, and
means for inserting a transmission power control signal into the vacant period, such that both a beginning of the transmission power control signal and an end of the transmission power control signal are contiguous with a period in which no communication data is present; and
a mobile station, comprising:
means for receiving data transmissions from the base station;
means for measuring a reception quality of a received data transmission from the base station;
means for transmitting a notification signal to the base station based on a detection of a degradation in reception quality; and
means for performing inter-frequency measurement during the vacant period;
wherein the base station further comprises:
means for changing the communication mode from a normal communication mode to a transmission mode having a vacant period, in response to the notification signal from the mobile station.

59. The communication control system according to claim 58, wherein the mobile station further comprises:
means for extracting the transmission power control signal from the received data transmission having the vacant period;
means for controlling a transmission power of a signal from the mobile station to the base station based on the extracted transmission power control signal; and
wherein the communication control system is a Code Division Multiple Access (CDMA) system.

60. A communication control system, comprising:
a base station, comprising:
means for compressing communication data, in a stream of communication data from the base station to a mobile station, in a time direction, thereby providing a vacant period, in which no communication data is present, in a data transmission from the base station to a mobile station, and
means for
inserting a transmission power control signal into the vacant period, such that both a beginning of the transmission power control signal and an end of the transmission power control signal are contiguous with a period in which no communication data is present, and
inserting a pilot signal, such that a beginning of the pilot signal is contiguous with an end of a period in which communication data is present prior to the vacant period; and
a mobile station comprising:
means for performing inter-frequency measurement during the vacant period.

61. The communication control system according to claim 60, further comprising:
a mobile station, comprising:
means for receiving data transmissions from the base station;
means for extracting the transmission power control signal from the received data transmission having the vacant period;
means for controlling a transmission power of a signal from the mobile station to the base station based on the extracted transmission power control signal; and
wherein the communication control system is a Code Division Multiple Access (CDMA) system.

62. The communication control system according to claim 60, further comprising:
a mobile station, comprising:
means for receiving data transmissions from the base station;
means for extracting the pilot signal from the received data transmission having the vacant period;
means for measuring a reception quality of a received data transmission from the base station, on the basis of the extracted pilot signal, and
means for generating a second transmission power control signal and transmitting the second transmission power control signal to the base station, on the basis of the measured reception quality;

wherein the second transmission power control signal controls transmission power of a signal from the base station to the mobile station.

63. The communication control system according to claim 60, further comprising:
a mobile station, comprising:
means for receiving data transmissions from the base station;
means for measuring a reception quality of a received data transmission from the base station; and
means for transmitting a notification signal to the base station based on a detection of a degradation in reception quality;
wherein the base station further comprises:
means for changing the communication mode from a normal communication mode to a transmission mode having a vacant period, in response to the notification signal from the mobile station.

64. The communication control system according to claim 62 or claim 63, wherein the mobile station further comprises:
means for extracting the transmission power control signal from the received data transmission having the vacant period;
means for controlling a transmission power of a signal from the mobile station to the base station based on the extracted transmission power control signal; and
wherein the communication control system is a Code Division Multiple Access (CDMA) system.

65. A communication control system, comprising:
a base station, comprising:
means for compressing communication data, in a stream of communication data from the base station to a mobile station, in a time direction, thereby providing a vacant period, in which no communication data is present, in a data transmission from the base station to a mobile station, and
means for
inserting a transmission power control signal into the vacant period, such that both a beginning of the transmission power control signal and an end of the transmission power control signal are contiguous with a period in which no communication data is present,
inserting a first pilot signal, such that a beginning of the first pilot signal is contiguous with an end of a period in which communication data is present prior to the vacant period, and
inserting a second pilot signal, such that an end of the second pilot signal is contiguous with a beginning of a period in which communication data is present after the vacant period; and
a mobile station comprising:
means for performing inter-frequency measurement during the vacant period.

66. The communication control system according to claim 65, further comprising:
a mobile station, comprising:
means for receiving data transmissions from the base station;
means for extracting the transmission power control signal from the received data transmission having the vacant period;
means for controlling a transmission power of a signal from the mobile station to the base station based on the extracted transmission power control signal; and wherein the communication control system is a Code Division Multiple Access (CDMA) system.

67. The communication control system according to claim 65, further comprising:
a mobile station, comprising:
means for receiving data transmissions from the base station;
means for extracting at least one of the first and second pilot signals from the received data transmission having the vacant period;
means for measuring a reception quality of a received data transmission from the base station, on the basis of the at least one extracted pilot signal, and
means for generating a second transmission power control signal and for transmitting the generated second transmission power control signal to the base station, on the basis of the measured reception quality;
wherein the second transmission power control signal controls transmission power of a signal from the base station to the mobile station.

68. The communication control system according to claim 65, further comprising:
a mobile station, comprising:
means for receiving data transmissions from the base station;
means for measuring a reception quality of a received data transmission from the base station; and
means for transmitting a notification signal to the base station based on a detection of a degradation in reception quality;
wherein the base station further comprises:
means for changing the communication mode from a normal communication mode to a transmission mode having a vacant period, in response to the notification signal from the mobile station.

69. The communication control system according to claim 67 or 68, wherein the mobile station further comprises:
means for extracting the transmission power control signal from the received data transmission having the vacant period;
means for controlling a transmission power of a signal from the mobile station to the base station based on the extracted transmission power control signal; and
wherein the communication control system is a Code Division Multiple Access (CDMA) system.

70. A communication control system, comprising:
a base station, comprising:
means for compressing communication data, in a stream of communication data from the base station to a mobile station, in a time direction, thereby providing a vacant period, in which no communication data is present, in a data transmission from the base station to a mobile station, and
means for
inserting a transmission power control signal into the vacant period, such that both a beginning of the transmission power control signal and an end of the transmission power control signal are contiguous with a period in which no communication data is present, and
inserting a pilot signal, such that an end of the pilot signal is contiguous with a beginning of a period in which communication data is present after the vacant period; and
a mobile station comprising:

means for performing inter-frequency measurement during the vacant period.

71. The communication control system according to claim 70, further comprising:
a mobile station, comprising:
means for receiving data transmissions from the base station;
means for extracting the transmission power control signal from the received data transmission having the vacant period;
means for controlling a transmission power of a signal from the mobile station to the base station based on the extracted transmission power control signal; and
wherein the communication control system is a Code Division Multiple Access (CDMA) system.

72. The communication control system according to claim 70, further comprising:
a mobile station, comprising:
means for receiving data transmissions from the base station;
means for extracting the pilot signal from the received data transmission having the vacant period;
means for measuring a reception quality of a received data transmission from the base station, on the basis of the extracted pilot signal, and
means for generating a second transmission power control signal and transmitting the second transmission power control signal to the base station, on the basis of the measured reception quality;
wherein the second transmission power control signal controls transmission power of a signal from the base station to the mobile station.

73. The communication control system according to claim 70, further comprising:
a mobile station, comprising:
means for receiving data transmissions from the base station;
means for measuring a reception quality of a received data transmission from the base station; and
means for transmitting a notification signal to the base station based on a detection of a degradation in reception quality;
wherein the base station further comprises:
means for changing the communication mode from a normal communication mode to a transmission mode having a vacant period, in response to the notification signal from the mobile station.

74. The communication control system according to claim 72 or 73, wherein the mobile station further comprises:
means for extracting the transmission power control signal from the received data transmission having the vacant period;
means for controlling a transmission power of a signal from the mobile station to the base station based on the extracted transmission power control signal; and
wherein the communication control system is a Code Division Multiple Access (CDMA) system.

75. The communication control system according to claim 70, wherein the data transmission from the base station to the mobile station includes a second pilot signal present within a data transmission prior to the vacant period, such that an end of the second pilot signal is contiguous with a beginning of the vacant period.

76. A communication control method, comprising:
compressing communication data, in a stream of communication data from a base station to a mobile station, in a time direction, thereby providing a vacant period, in which no communication data is present, in a data transmission from a base station to a mobile station;
inserting a transmission power control signal into the vacant period, such that both a beginning of the transmission power control signal and an end of the transmission power control signal are contiguous with a period in which no communication data is present; and
performing inter-frequency measurement during the vacant period;
wherein the transmission from the base station to the mobile station includes a pilot signal present within a data transmission prior to the vacant period, such that an end of the pilot signal is contiguous with a beginning of the vacant period.

77. A communication control system, comprising:
a base station, comprising:
a first circuit which compresses communication data, in a stream of communication data from a base station to a mobile station, in a time direction, and thereby provides a vacant period, in which no communication data is present, in a data transmission from a base station to a mobile station, and
a second circuit which inserts a transmission power control signal into the vacant period, such that both a beginning of the transmission power control signal and an end of the transmission power control signal are contiguous with a period in which no communication data is present; and
a mobile station comprising:
a circuit which performs inter-frequency measurement during the vacant period;
wherein the transmission from the base station to the mobile station includes a pilot signal present within a data transmission prior to the vacant period, such that an end of the pilot signal is contiguous with a beginning of the vacant period.

78. A mobile station in a mobile communication system, comprising:
a transmission and reception circuit which receives data transmissions from a base station;
wherein at least one of the received data transmissions includes:
a vacant period in which no communication data is present, and
a transmission power control signal inserted into the vacant period, such that both a beginning of the transmission power control signal and an end of the transmission power control signal are contiguous with a period in which no communication data is present; and
a circuit which performs inter-frequency measurement during the vacant period;
wherein communication data in the data transmission from the base station is compressed in a time direction and thereby, the vacant period is provided; and
wherein the at least one transmission from the base station to the mobile station includes a pilot signal present within a data transmission prior to the vacant period, such that an end of the pilot signal is contiguous with a beginning of the vacant period.

79. A control method of a mobile station in a mobile communication system, comprising:
receiving data transmissions from a base station, wherein at least one of the received data transmissions includes:
a vacant period in which no communication data is present, and a transmission power control signal inserted into the vacant period, such that both a beginning of the transmission power control signal and an end of the transmission power control signal are contiguous with a period in which no communication data is present;

extracting the transmission power control signal from the received data transmission having the vacant period;

increasing or decreasing transmission power of the mobile station based on the extracted transmission power control signal; and performing inter-frequency measurement during the vacant period;

wherein communication data in the data transmission from the base station is compressed in a time direction, and thereby the vacant period is provided;

wherein the mobile station operates according to a Code Division Multiple Access (CDMA) system; and wherein the at least one transmission from the base station to the mobile station includes a pilot signal present within a data transmission prior to the vacant period, such that an end of the pilot signal is contiguous with a beginning of the vacant period.

80. A communication control system, comprising:

a base station, comprising:

means for compressing communication data, in a stream of communication data from the base station to a mobile station, in a time direction, thereby providing a vacant period, in which no communication data is present, in a data transmission from the base station to a mobile station, and means for inserting a transmission power control signal into the vacant period, such that both a beginning of the transmission power control signal and an end of the transmission power control signal are contiguous with a period in which no communication data is present; and a mobile station comprising:

means for performing inter-frequency measurement during the vacant period;

wherein the transmission from the base station to the mobile station includes a pilot signal present within a data transmission prior to the vacant period, such that an end of the pilot signal is contiguous with a beginning of the vacant period.

* * * * *